(12) United States Patent
St. Pierre et al.

(10) Patent No.: US 6,366,986 B1
(45) Date of Patent: Apr. 2, 2002

(54) METHOD AND APPARATUS FOR DIFFERENTIAL BACKUP IN A COMPUTER STORAGE SYSTEM

(75) Inventors: Edgar J. St. Pierre, Fall River; Alton Gill, Harvard, both of MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/107,679

(22) Filed: Jun. 30, 1998

(51) Int. Cl.[7] ................................................ G06F 12/16
(52) U.S. Cl. ...................................................... 711/162
(58) Field of Search ................................. 711/161, 162

(56) References Cited

U.S. PATENT DOCUMENTS

| | | | |
|---|---|---|---|
| 4,686,620 A | * 8/1987 | Ng ................................ 707/10 |
| 4,703,481 A | 10/1987 | Fremont |
| 5,119,483 A | 6/1992 | Madden et al. |
| 5,222,217 A | * 6/1993 | Blount et al. ................ 707/204 |
| 5,263,154 A | 11/1993 | Eastridge et al. |
| 5,381,545 A | 1/1995 | Baker et al. |
| 5,404,508 A | 4/1995 | Konrad et al. |
| 5,522,037 A | * 5/1996 | Kitagawa et al. .............. 714/40 |
| 5,574,906 A | 11/1996 | Morris |
| 5,594,900 A | 1/1997 | Cohn et al. |
| 5,642,496 A | * 6/1997 | Kanfi ........................... 711/162 |
| 5,649,196 A | * 7/1997 | Woodhill et al. ............ 707/204 |
| 5,684,991 A | * 11/1997 | Malcolm ...................... 707/204 |
| 5,764,905 A | * 6/1998 | Catozzi et al. .............. 709/215 |
| 5,778,395 A | * 7/1998 | Whiting et al. ............. 707/204 |
| 5,794,242 A | * 8/1998 | Green et al. ................... 707/10 |
| 5,991,772 A | 11/1999 | Doherty et al. |
| 6,023,710 A | * 2/2000 | Steiner et al. ............... 707/204 |

* cited by examiner

*Primary Examiner*—Jack A. Lane
(74) *Attorney, Agent, or Firm*—Wolf, Greenfield & Sacks, P.C.

(57) ABSTRACT

Method and apparatus for backup in restoring data on a computer system are disclosed. Backups may include a differential backup. In a differential backup, only some (but not all) segments of data in a primary copy are backed up. The segments may correspond to physical segments of storage in a storage system, rather than logical level segments of storage. The method and apparatus may include constructing a complete copy of a backed up element from an earlier fill backup and a subsequent differential backup.

26 Claims, 23 Drawing Sheets

METHOD AND APPARATUS FOR DIFFERENTIAL BACKUP IN A COMPUTER STORAGE SYSTEM

FIELD OF THE INVENTION

This invention relates to data storage for computers, and more particularly to use of physical change data for backup and restoring of data.

DISCUSSION OF THE RELATED ART

Virtually all computer applications (or programs) rely on storage. This storage can be used for both storing the computer code and for storing data manipulated by the code. (The term "data" refers to any information, including formatting information, executable code and data for manipulation by an application program.)

Storage technology has developed in a variety of different directions. Accordingly, a wide variety of storage systems are available. It has become impractical, therefore, for the person writing the computer application to also be responsible for detailed control over how data is stored on the storage system.

For this (and other) reasons, application programs typically run on an operating system (e.g., Unix, Windows, MS DOS, Linux, and the many variations of each). Once again, however, the operating system may be used with a variety of storage systems.

It would be highly inefficient to have to change the operating system, or the application programs, every time a change is made to physical storage. As a result, various layers of abstraction have evolved for viewing how data is actually stored in the storage system.

FIG. 1 illustrates one way of viewing the layers of abstraction. At the top level 10, the application program may assume that data is stored in a manner that has very little to do with how the data is placed onto the physical device. For example, the application may view the storage system as containing a number of directories and data files within the directories. Thus, in an application written for use in the Unix operating system, the application will assume that files are stored according to the Unix directory structure (including hierarchical directories and files located within the directories). This assumed organization of physical storage may have very little to do with how that data is actually stored onto the actual storage devices. This view may be referred to as the "logical view" because of the separation between the logical view of data from the application level is divorced from any view of how the data is physically stored.

The application level 10 then interfaces with the file system level 12. The file system level is concerned with how files are stored on disks and how to make everything work efficiently and reliably. Thus, the file system level may be responsible for storing directory structure, and for breaking up files into constituent data blocks for storage onto a physical storage system. For example, in most implementations of Unix, each file has an associated I-node. This node may contain accounting and protection information and, additionally, a set of pointers to data blocks.

Relatively early in the development of computer systems, disk drives became a fundamental device for storage. Accordingly, computer operating systems have been developed assuming that memory will rely on input/output ("I/O") to a disk drive. The file system 12, therefore, may assume one or more "volumes" which correspond to a physical storage unit such as a disk drive (or any other unit of storage), with data stored in blocks on the disk drive.

The demand for storage to be available for use by applications has sky rocketed. As a result, a number of separate physical devices may be required to accommodate the total amount of storage required for a system. In addition, storage systems are often changed or reconfigured.

To insulate the operating system from any changes within the physical device storage system, some mechanism is often employed to flexibly map a standard (volume) view of physical storage onto an actual physical storage system. The logical volume manager 14 of FIG. 1 can help achieve this function by mapping the file system view of data storage into an intermediate layer.

Finally, the actual storage reading and writing (and, potentially, additional mapping onto physical storage devices) occurs within the physical storage system level 16, as illustrated in FIG. 1. Thus, for example, the logical volume manager may map the file system level view of data into volume sizes corresponding to fixed physical storage segment sizes for storage on a physical device (e.g, block sizes). The physical storage system level may then map the logical volume manager level volumes onto physical storage segments (e.g., hyper-volumes discussed below).

Logical volume managers have been implemented for use with the HP-UX by HP and by VERITAS operating systems, as examples. The Symmetrix line of storage systems, available from EMC Corporation, of Hopkinton, Mass., is one system capable of mapping hyper-volumes onto physical devices. (The Symmetrix product line of integrated cached disk arrays is described in numerous publications form EMC Corporation, including the Symmetrix model 55xx product manual, p-n200-810-550, rev.f, February, 1996.)

In the above examples, the mapping of application level data into actual physical storage occurs across four levels: application level to file system level; file system level to LVM level; LVM level to physical storage system level; and physical storage system level to the actual physical storage devices. More or fewer levels of mapping can be done. In some systems, for example, only one level of mapping is performed, e.g., mapping from the application level directly onto actual physical storage devices. In many systems, the mapping stage at the LVM level is omitted. Similarly, in many systems, no mapping is done at the physical storage level (e.g., data is stored directly onto actual devices corresponding to the format of the preceding level and without any further mapping onto physical storage components.)

FIG. 2A illustrates an example of the mapping that may be performed by the logical volume manager 14 and the physical storage system 16, to store data onto actual physical devices. The application/file system's view of the storage system contemplates three separate storage devices— volume A 20, volume B 21, and volume C 22. Thus, as far as the file system level 12 can discern, the system consists of three separate storage devices 20–22. Each separate storage device may be referred to as a "virtual volume," or "virtual disk." This reflects that the operating system's view of the storage device structure may not correspond to the actual physical storage system implementing the structure (hence, "virtual"). Unlike the application level 10, however, the file system 12 perspective is as if the file system 12 were dealing with raw physical devices or volumes.

As far as the file system level is concerned, the virtual volumes may be divided up into "partitions," which are continuous segments of storage. These partitions are, in fact, "virtual" partitions, because the partition may actually be stored across a variety of physical storage segments (e.g., hyper-volumes).

In FIG. 2A, the data is physically stored on the physical storage devices 24–26. In this particular example, although there are three physical devices 24–26 and three volumes 20–22, there is not a one to one mapping of the virtual volumes to physical devices. In this particular example, the data in volume A 20 is actually stored on physical devices 24–26, as indicated at 20a, 20b and 20c. In this example, volume B is stored entirely on physical device 24, as indicated at 22a, 22b. Finally, volume C is stored on physical device 24 and physical device 26 as indicated at 21a, 21b.

In this particular example, the boxes 20a–20c, 21a–21b and 22a–22b represent contiguous segments of storage within the respective physical devices 24–26. These contiguous segments of storage may, but need not, be of the same size. The segments of storage may be referred to as "hyper-volumes," and correspond to segments of physical storage that can be used as components when constructing a virtual volume for use by the file system. A hypervolume may be comprised of a number of "data blocks." A data block is a unit of storage (e.g., a 512 byte block) that is written or read at one time from the physical storage device.

Array management software running on a general purpose processor (or some other mechanism such as a custom hardware circuit) 23 translates requests from a host computer (not shown) (made assuming the logical volume structure 20–22) into requests that correspond to the way in which the data is actually stored on the physical devices 24–26. In practice, the array management software 23 may be implemented as a part of a unitary storage system that includes the physical devices 24–26, may be implemented on a host computer, or may be done in some other manner.

In FIG. 2A the array management software 23 performs the functions of both the logical volume manager 14 (if present) and the physical storage level 16, by mapping the file system's virtual volumes 20–22 into segments that can be stored onto physical devices 24–26. The array management software 23 also performs the functions of the physical storage system level 16, by determining where to store the hyper-volumes 20A–20C, 21A–21B and 22A–22B.

The physical storage devices shown in the example of FIG. 2A are disk drives. A disk drive may include one or more disks of a recording media (such as a magnetic recording medium or an optical recording medium). Information can be written and read from this storage medium for storage purposes. The recording medium is typically in the form of a disk that rotates. The disk generally includes a number of tracks on which the information is recorded and from which the information is read. In a disk drive that includes multiple disks, the disks are conventionally stacked so that corresponding tracks of each disk overlie each other. In this case, specification of a single track on which information is stored within the disk drive includes not only specification of an individual track on a disk, but also which of the multiple disks the information is stored on. The physical storage devices for use with the present invention may, however, be any other storage mechanism.

FIG. 2B illustrates one example of mapping between the top level of abstraction—the application level—to the actual physical storage level. An application level file 200 includes visual information. This information is in the form of a conventional file and includes a series of bits.

When the application level file is mapped onto physical storage, the application level file may be converted into segments of the individual bits, e.g., segment 203. Thus, a segment of the application level file 203 is mapped (for example according to the general mapping structure described above with reference to FIG. 1) onto actual physical storage devices 204–206. In this example, the first segment of bits in 203 in the application level file 200 is mapped onto physical storage device 204, at a portion 208 of the physical storage device 204. As shown in FIG. 2B, the individual segments of bits in the application level file 200 may be mapped anywhere among a plurality of actual physical storage devices. The granularity of the segments of bits (e.g., segment 203) may correspond to one of a variety of different levels. For example, the granularity of the segments may be a 512 byte data block. In another embodiment, the granularity may correspond to the amount of data stored in a track of the physical storage device 204–206 (when the physical storage devices are disk drives).

In a system including an array of physical disk devices, such as disk devices 24–26 of FIG. 2A, each device typically performs error detection and/or correction for the data stored on the particular physical device. Accordingly, each individual physical disk device detects when it does not have valid data to provide and, where possible, corrects the errors. Even where error correction is permitted for data stored on the physical device, however, a catastrophic failure of the device would result in the irrecoverable loss of data.

Accordingly, storage systems have been designed which include redundant storage capacity. A variety of ways of storing data onto the disks in a manner that would permit recovery have developed. A number of such methods are generally described in the RAIDbook, A Source Book For Disk Array Technology, published by the RAID Advisory Board, St. Peter, Minn. (5th Ed., February, 1996). These systems include "RAID" storage systems. RAID stands for Redundant Array of Independent Disks.

FIG. 3A illustrates one technique for storing redundant information in a RAID system. Under this technique, a plurality of physical devices 31–33 include identical copies of the data. Thus, the data M1 can be "mirrored" onto a portion 31a of physical device 31, a portion 32a of physical device 32 and a portion 33a of physical device 33. In this case, the aggregate portions of the physical disks that store the duplicated data 31a, 32a and 33a may be referred to as a "mirror group." The number of places in which the data M1 is mirrored is generally selected depending on the desired level of security against irrecoverable loss of data.

In a mirror group, the copies are "linked." That is, any update to one mirror causes an update to each other mirror in the group.

FIG. 3A shows three physical devices 31–33 which appear to be located in close proximity, for example within a single storage system unit. For very sensitive data, however, one or more of the physical devices that hold the mirrored data may be located at a remote facility.

"RAID 1" is an example of data redundancy through mirroring of data. In a RAID 1 architecture, a number of different mechanisms may be used for determining how to access and update data to improve, for example, performance of the storage system. In any event, a RAID 1 architecture certainly has the ability to recover lost data. Unfortunately, the RAID 1 architecture multiplies the cost of physical storage by the number of "mirrors" included in the mirror group.

FIG. 3B illustrates a solution that requires less added storage. In FIG. 3B, data is stored at locations 34a–34d. In this particular example, the physical device 33 includes parity information P1 at 35a, 35b. The parity information is generated by a simple exclusive-OR ("XOR") of the corresponding bits of data. Thus, the parity information P1 would be generated by XORing the corresponding bits of the data D1 and data D2.

A variety of mechanisms are known for distributing the parity information on the physical devices. In the example shown in FIG. 3B, all of the parity information is stored on a single physical device 33. In other cases, the parity information may be distributed across the physical devices.

FIG. 4 illustrates the concept that, within a given disk array, there is no need for all of the data to follow the same redundancy rule. In FIG. 4, a first group of storage segments on physical devices 40–42 form a mirror group 44. In the mirror group 44, the entire contents of a single logical volume (HV-A) are mirrored on three different physical devices 40–42.

In FIG. 4, a single virtual volume is stored on the fourth physical device 43, without any redundancy information, as indicated at 46.

Finally, a last group of data segments 45, on all four physical devices 40–43, implement a parity redundancy scheme. In this particular example, the parity information is stored in segments of memory on two different physical devices 42-43, as indicated at 47a and 47b.

The storage system of FIG. 4 contains redundant information that permits recovery from errors, including use of a mirror for data located at a remote facility, that also permits recoveries from catastrophic failure.

SUMMARY OF THE INVENTION

According to one embodiment of the present invention, a method of backing up data in a computer storage system is disclosed. According to this embodiment, segments of data in the memory that have changed are identified. A backup is formed of the identified changed segments, omitting at least one of the segments that has not been changed. In one embodiment, the segments are formed in units corresponding to physical segments of storage in the computer system, such as a block of data or a track in a disk drive. This embodiment may further comprise identifying segments that have changed since a preceding backup and at a second time, forming a second backup that includes the changed segments from the time of the preceding backup to the second time. In another embodiment, the second backup is formed of segments that have been changed since the first backup. The segments may constitute a logical element, and mapping between locations of the segments in the logical element to the locations in physical storage may be performed.

According to another embodiment of the present invention, a backup storage system is disclosed. According to this embodiment, a differential backup generator receives information specifying which physical segments of storage in a physical storage device have changed, and generates a differential backup of the changed segments accordingly. This embodiment also includes a backup storage device to store the differential backup. The backup storage system according to this embodiment may include means for tracking which of the physical segments have been changed since a preceding level zero backup. In another embodiment, the physical storage device may include means for tracking which of the physical segments have been changed since a preceding differential backup.

According to another embodiment of the present invention, a method of forming a complete backup copy of a plurality of segments of data in a computer storage system is disclosed. According to this embodiment, an earlier backup of the plurality of segments is provided. In addition, a later copy of at least one of the segments, corresponding to a time after the earlier backup, is provided. A complete backup is then formed from the earlier backup copy and the first later copy. According to another embodiment, additional later copies (such as differential backups) may be used to generate the complete copy.

According to another embodiment of the present invention, a backup storage system is disclosed. This embodiment includes means for storing an earlier backup copy of a plurality of segments corresponding to an earlier time and for storing a first later copy of at least one of the segments corresponding to a time after the earlier time. This embodiment further includes means for performing a complete backup from the earlier backup copy and the first later copy.

According to another embodiment of the present invention, a backup system for storing backup information in a computer storage system is disclosed. According to this embodiment, a first memory unit storing a backup copy of a plurality of physical segments is provided. This backup copy corresponds to a first time. In addition, the backup system includes a second memory unit storing a later copy of at least one of the physical segments, corresponding to a time after the first time.

According to another embodiment of the present invention, a method of restoring a primary copy of a plurality of segments of data stored on a physical storage device is disclosed. According to this embodiment, the plurality of segments forms a logical element and the restoration is to a state of the primary copy of a target time. This embodiment includes steps of identifying which of the segments of data have changed since the target time and restoring the identified changed segments to the primary copy, while retaining at least one of the segments already in the primary copy. The effect of the method is to undo changes that have been performed.

According to another embodiment of the present invention, a backup storage system is disclosed. According to this embodiment, a restore controller is included to restore a primary copy of a plurality of segments of the data stored on the physical storage device, the plurality of segments forming a logical element, to a state at a target time. This embodiment further includes a backup memory system to store and retrieve copies of the segments corresponding to a time at least as early as the target time. Finally, in this embodiment, the restore controller comprises a mapper to receive information identifying which of the physical segments in the primary copy have been changed since the target time and to identify corresponding copies of the changed segments in the backup memory system.

According to another embodiment of the present invention, a backup storage system is disclosed. According to this embodiment, the system restores a primary copy of a plurality of data stored on a physical storage device, the plurality of segments forming a logical element, again to a state corresponding to a target time. According to this embodiment, the system includes means for identifying which of the segments of data have changed since the target time and means for restoring the identified changed segments.

According to another embodiment of the present invention, a method of backing up a primary copy of a plurality of data segments at a backup time is disclosed.

According to this embodiment, a backup copy of the primary copy is provided. The segments of data of the primary copy that have been changed since an earlier time are identified. A differential backup is formed, backing up the corresponding copies of the segments of the backup copy for those segments to be changed. After the differential backup has been formed, the backup copy is updated from the primary copy. The backup copy may be a full level zero backup and may also be a mirror of the primary copy.

According to another embodiment of the present invention, a method of backing up a copy of a plurality of data segments at a backup time is disclosed. According to this embodiment, the data segments to be changed are identified. Before changing the identified segments, however, a differential backup of those segments is formed.

According to another embodiment of the present invention, a method of restoring a primary copy of a plurality of data segments to correspond to a target time is disclosed. According to this embodiment, a first differential backup copy of less than all of the data segments of the primary copy is formed. The first differential backup copy corresponds to a first time, more recent than the target time. The first differential backup copy is then used to identify segments of the primary copy that have been changed since the target time. Finally, the identified segments are restored. The step of restoring the identified segments may correspond to using a differential backup copy of the segment from the target time or before the target time.

According to another embodiment of the present invention, a method of restoring a primary copy of a plurality of data segments to their state at a target time is disclosed. According to this embodiment, a backup copy of the primary copy is provided. The backup copy corresponds to a first time, which is more recent than the target time. A first differential backup copy is provided, the first differential backup copy being no more recent than the target time. According to this embodiment, at least one of the segments of the backup copy is replaced with a corresponding segment of the first differential backup. The primary copy may then be restored from the backup copy. The backup copy may be a mirror of the primary copy.

According to another embodiment of the present invention, a backup storage system to backup a primary copy of a plurality of data segments is disclosed. According to this embodiment, the system includes a backup manager to generate differential backups just before the segments are updated. This system further includes a backup memory to store the differential backups.

According to another embodiment of the present invention, a backup system for storing backups for a first and a second time is disclosed. The first time is an earlier time than the second time. According to this embodiment, a first memory unit stores a backup copy of a plurality of physical segments of memory of a computer storage system, the physical segments constituting a logical element, the backup copy corresponding to the second (later) time. This system also includes a second memory unit storing an earlier differential backup copy for the physical segments, which corresponds to the first (earlier) time.

DETAILED DESCRIPTION

Figure 4:
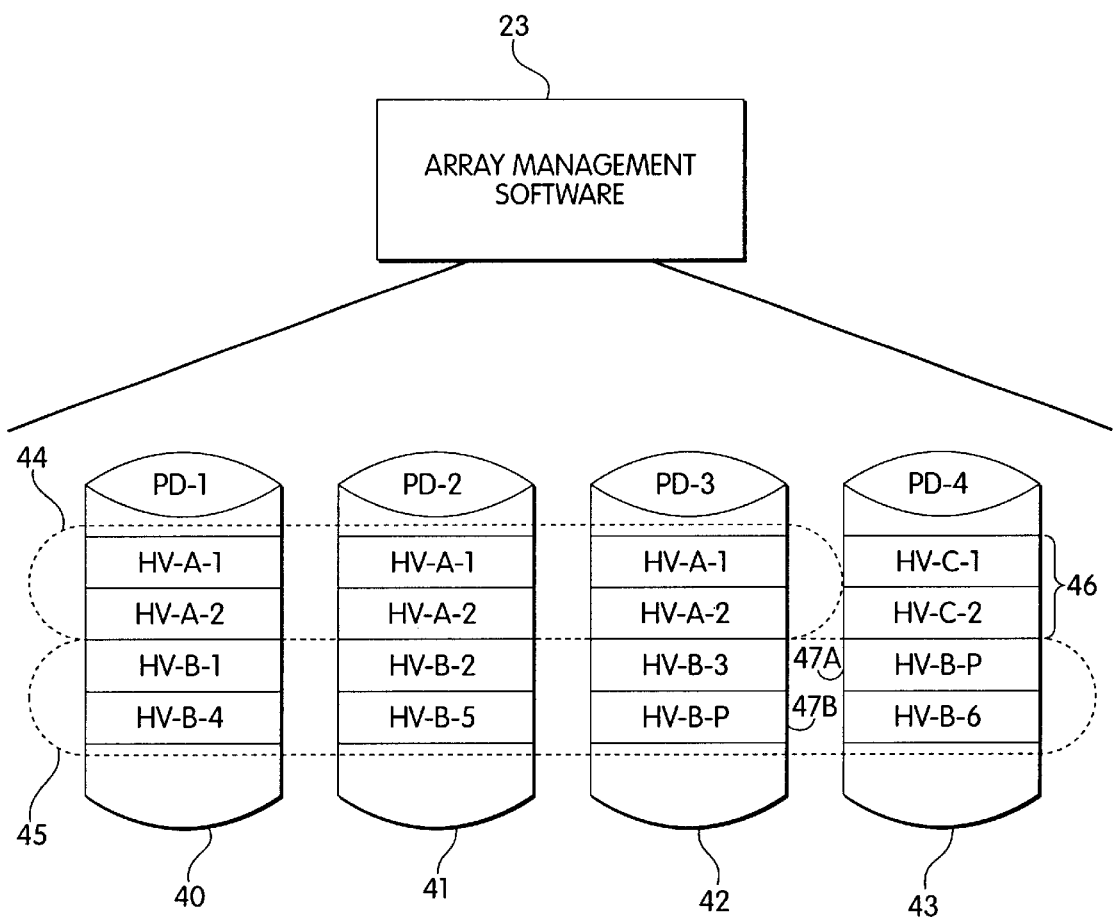
FIG. 4 illustrates an example of multiple redundancy groups within a single array of storage devices.

Notwithstanding the possible storage of redundant information within a storage system, such as that of FIG. 4, further mechanisms for backup of data are still required. For example, a number of events may arise where an old file still needs to be restored. For example, if a software or hardware error causes miswriting of data onto a mirrored disk (e.g., HV-A-1 of FIG.4), the data may be corrupted on all of the mirrors (e.g., each copy of HV-A-1). Accordingly, a filler backup and restore system may be required.

Figure 5:
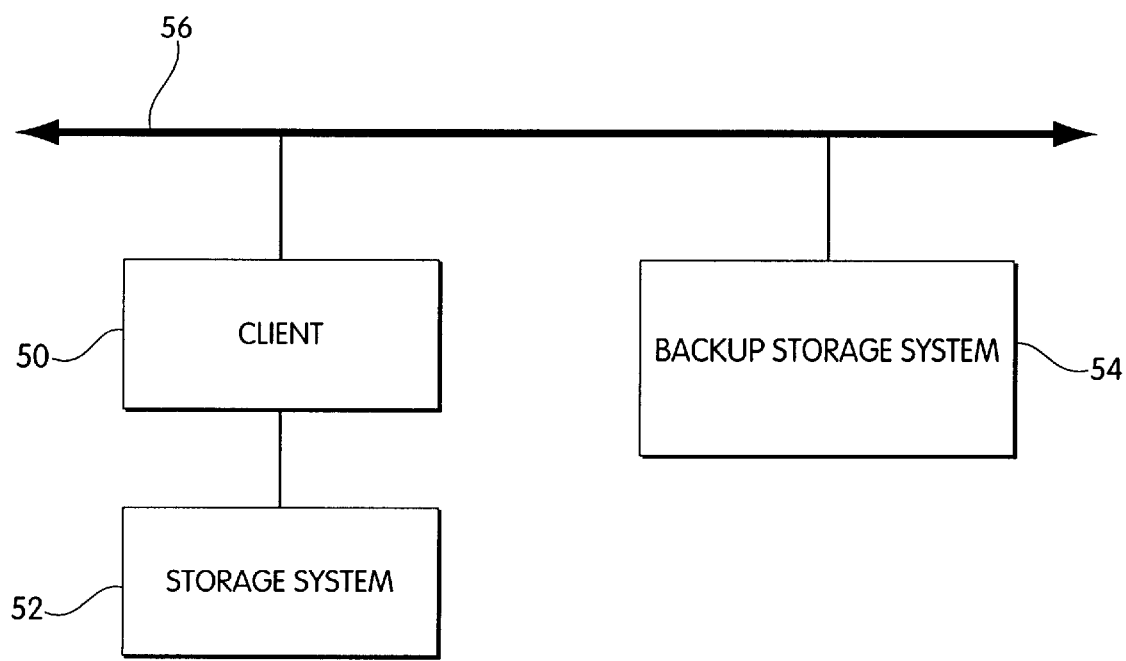
FIG. 5 illustrates an example of a backup storage system.

FIG. 5 illustrates one system for additional backup, which may be used or adapted in accordance with the present invention. In FIG. 5, a computer or client 50 performs its operations using storage system 52. The client 50 may be any conventional computing system, such as a network client available from Sun Microsystems, and running the Solaris operating system (a version of Unix), an HP client running HP-UX (a Hewlett-Packard client, running a Hewlett-Packard version of the Unix operating system) or an IBM client running the AIX operating system (an IBM version of Unix) or any other system with an associated operating system. The storage system 52 may be any conventional storage system, including a Symmetrix storage system, described above. The client 50 may be connected to many other devices over a network 56.

A backup storage system 54 is also attached to the network 56. The backup storage system 54 includes a backup storage device (which may be disk drives, tape storage or any other storage mechanism), together with a system for placing data into the storage and recovering the data from that storage.

To perform a backup, the client 50 copies data from the storage system 52 across the network 56 to the backup storage system 54. This process can be explained in greater detail with reference to FIG. 1. The storage system 52 may correspond to the actual physical storage 16 of FIG. 1. For the client 50 to write the backup data over the network 56 to the backup storage system 54, the client 50 first converts the backup data into file data—i.e. gets the data from the physical storage system level 16, and converts the data into application level format (e.g. a file) through the logical volume manager level 14, the file system level 12 and the application level 10. Thus, an actual data file may be communicated over the network 56 to the backup storage device 54. When the backup storage device 54 receives the data file, the backup storage system 54 can take the application level 10 data file, convert it to its appropriate file system level 12 format for the backup storage system, which can then be converted through a logical volume manager 14 level and into physical storage 16.

This form of backing up data may be referred to as "logical—logical" backup. That is, the logical data is backed up on the backup storage device 54. The data to be backed up is presented independent of the manner in which it is physically stored on storage system 52 at the physical storage system level 16, independent of the file system level mechanisms on the client 50, and independent of how data is stored on the backup storage device 54.

The EDM (EMC Data Manager) line of products is capable of logical—logical backup over a network, as described in numerous publications available from EMC, including the EDM User Guide (Network) "Basic EDM Manual".

Figure 6:
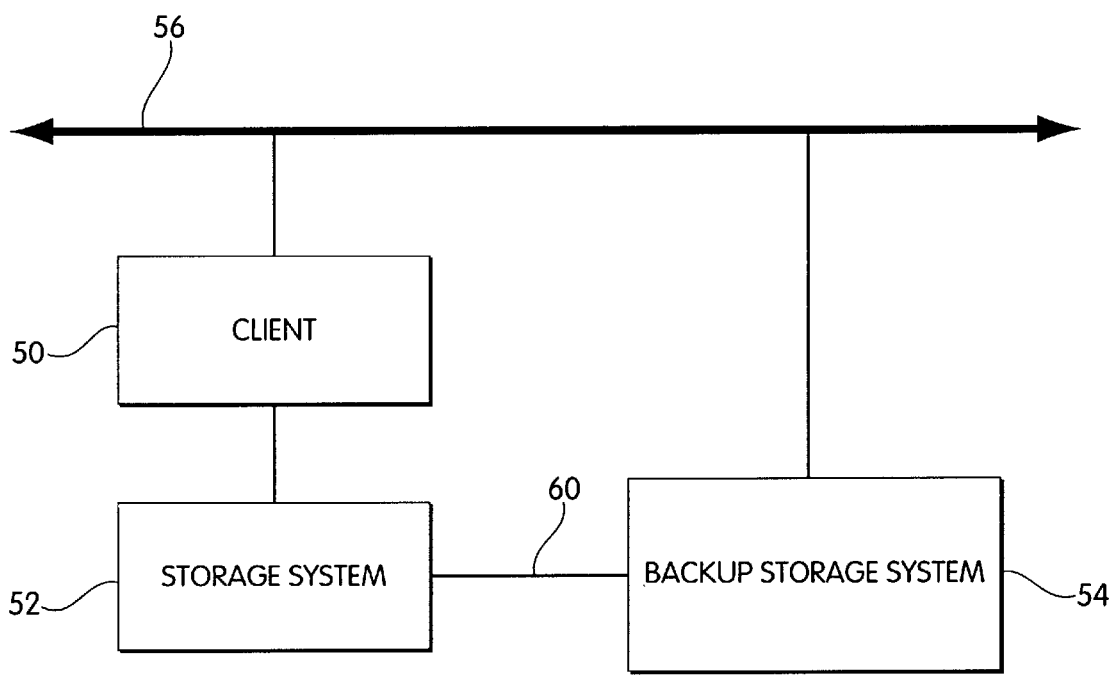
FIG. 6 illustrates one embodiment of a backup storage system that includes a mechanism for direct backup of data on the primary storage system.

FIG. 6 illustrates one embodiment of an alternative structure for backup of data. In the embodiment of FIG. 6, a direct connection 60 is established between the storage system 52 and the backup storage system 54. In this embodiment, the backup storage system may be a system as generally described in EMC Data Manager: Symmetrix Connect User Guide, P/N 200-113-591, Rev. C, December 1997, available from EMC Corporation of Hopkinton, Mass. The direct connection 60 may be a high speed data channel, such as a SCSI cable or one or more fiber-channel cables. In this system, a user may be permitted to backup data over the network 56, or the direct connection 60.

While the method and apparatus of the present invention may be described with reference to the systems and concepts described above and in the discussion of the related art, this is not intended to be limiting. The present invention has broader application. Certain aspects of the invention may be applied to any storage system. Accordingly, the invention is only limited by the claims set forth below.

Whether the restore and backup process is done at a logical level or at a physical level, backups in the prior art require copying a complete file (or in some instances even more, such as an entire partition) for the backup. Methods of backing up and restoring data on the system of FIG. 6 are described in co-pending and commonly owned U.S. patent application Ser. No. 09/052,579, U.S. Pat. No. 6,047,294 entitled "Logical Restore From A Physical Backup In A Computer Storage System," filed Mar. 31, 1998, and naming John Deshayes and Madhav Mutalik as inventors, and which is hereby incorporated herein by reference in its entirety.

Systems similar to FIG. 5 and FIG. 6 conventionally backup an entire logical construct or element specified by the user. For example, a user may specify a partition to be backed up. When this is done, the entire partition is copied to the backup storage system. Similarly, the user may specify a database or file to be backed up. In this case, the entire database or file is copied to the backup storage system.

This can require a significant amount of time, which is ultimately unnecessary. For example, an extremely large file may be backed up at one point in time. A second backup may then be performed at a later time. Very little of the file may have been changed between the two backups. Generating a new backup of the complete file can, therefore, be wasteful.

Differential Backup

Figure 7:
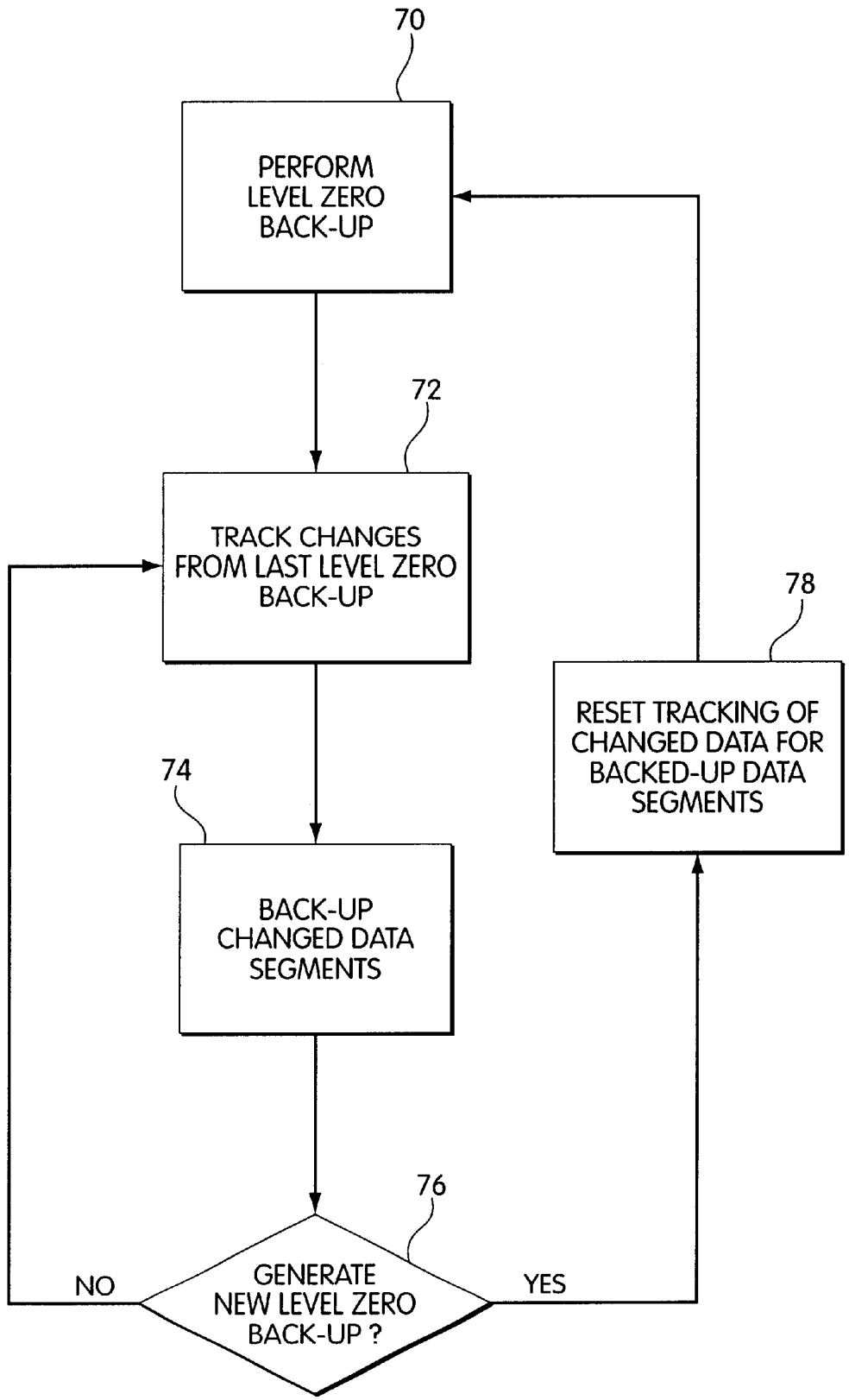
FIG. 7 illustrates one embodiment of a method for performing a differential backup.

FIG. 7 illustrates one embodiment of the present invention for creating a differential backup. A differential backup is a backup of only a portion of a logical element or construct, based on what has been changed during operation of the computer system.

At a step 70, a level zero backup is performed. A level zero backup is a complete backup of the logical construct. For example, a level zero backup of a file backs up the entire file. A level zero backup of a (virtual) partition backs up this entire partition. Thus, a level zero backup can be used to restore the logical construct without any further information.

Figure 2A:
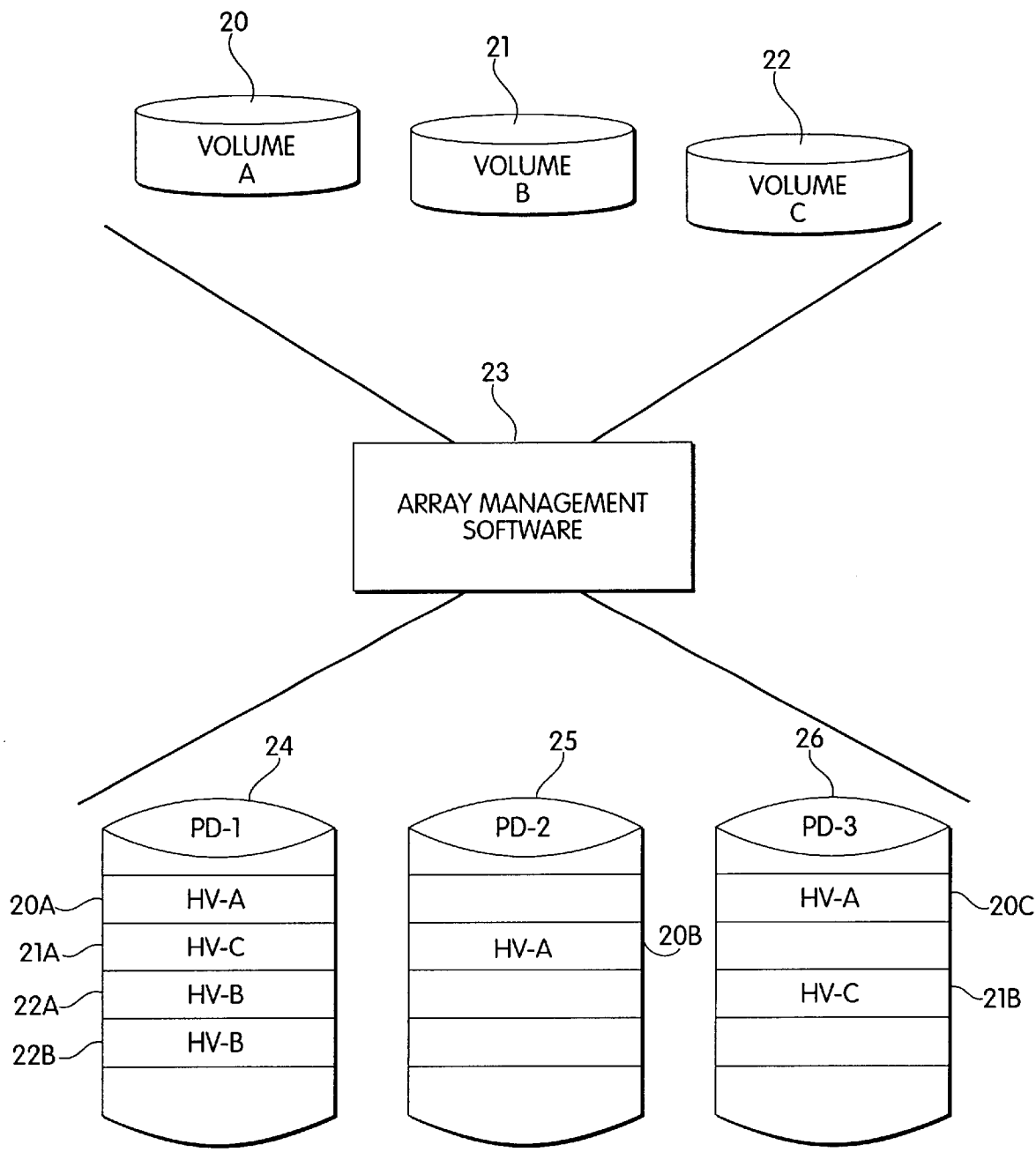
FIG. 2A illustrates an example of the relationship between logical volumes and physical storage devices.
Figure 2B:
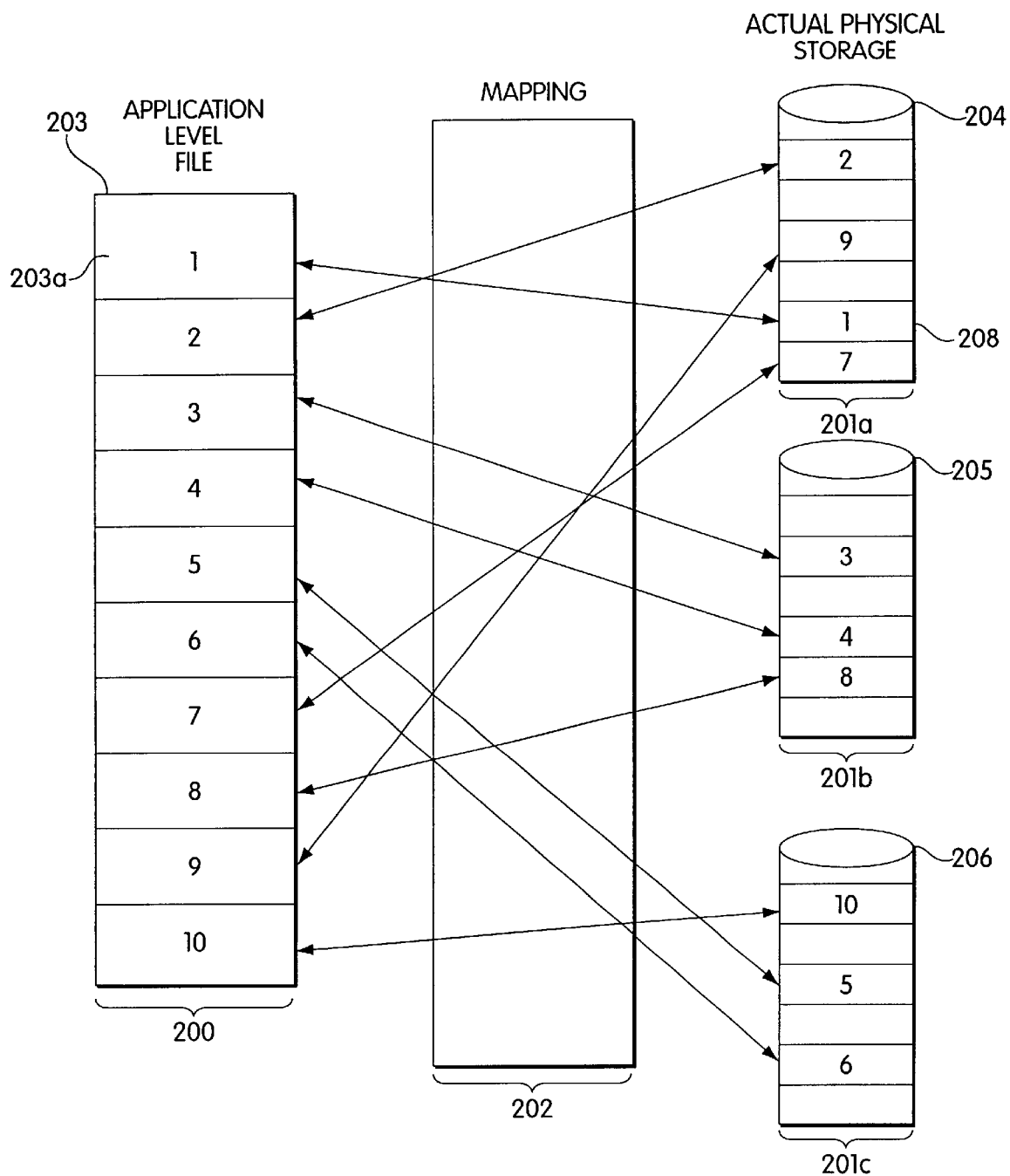
FIG. 2B illustrates an example of mapping a logical file onto a physical storage system.
Figure 3A:
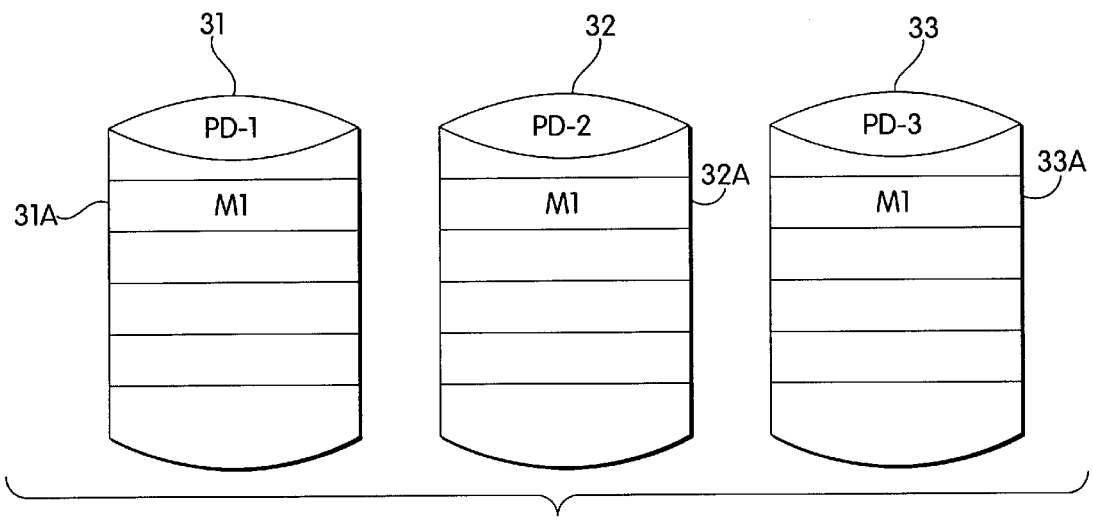
FIG. 3A illustrates an example of mirroring on different physical storage devices.
Figure 3B:
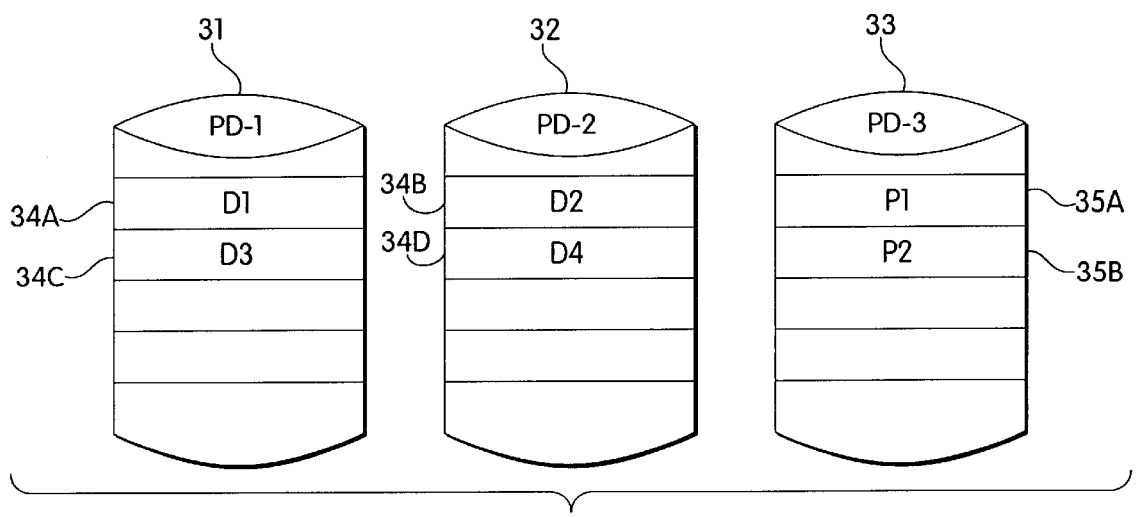
FIG. 3B illustrates an example of redundant parity information on physical storage devices.

At a step 72, the system tracks changes in data from the last level zero backup. For example, referring to FIG. 2B, the segments that included any changed data may be tracked. For example if segments 1, 3 and 5 include data that was changed, a corresponding bit or other record could be set indicating that these segments have changed (and not the others). As described more fully below, the segments may be defined by how the data is physically stored (e.g., by storage blocks) rather than based on logical level information.

At a step 74, those data segments that have been changed are backed up. By backing up only changed data segments, rather than the entire file, the generation of the backup may be performed much more quickly. One embodiment of a method for storing and recovering files using records of just changed data segments is discussed below. This backup may be referred to as an "differential backup" because less than all of the logical element is backed up, e.g., some data segments that have not been changed are backed up.

At a step 76, it is determined whether a new level zero backup should be generated. If not, the system continues tracking changes from the last level zero backup, at step 72. In this embodiment, therefore, the differential backup generated at step 74 always records changed data from the last level zero backup—not from the last differential backup. An alternative embodiment, where changes are tracked from the last differential backup, is discussed below with reference to FIGS. 17 and 18.

If a new level zero backup is to be generated, at a step 78, the tracking of changed data is reset. This may be performed, for example, by resetting "change bits" associated with the data segments, described below. While this is done, the system may be taken off-line or placed in backup mode to assure that data is not changed while the change bits are being reset (and the level zero backup performed) (e.g., as described below with reference to FIG. 10). When a new level zero backup is performed, future changes will be tracked from that level zero backup rather than an earlier one.

In another embodiment, resetting tracking of changed data may be performed after the step 74 of backing up changed data segments. In this case, each differential backup tracks changes only from the last differential backup. As discussed below, to restore data when this is done, multiple differential backup files may need to be examined, rather than just the one differential backup performed at the time of interest.

Level Zero Backup (step 70 of FIG. 7)

Figure 8:
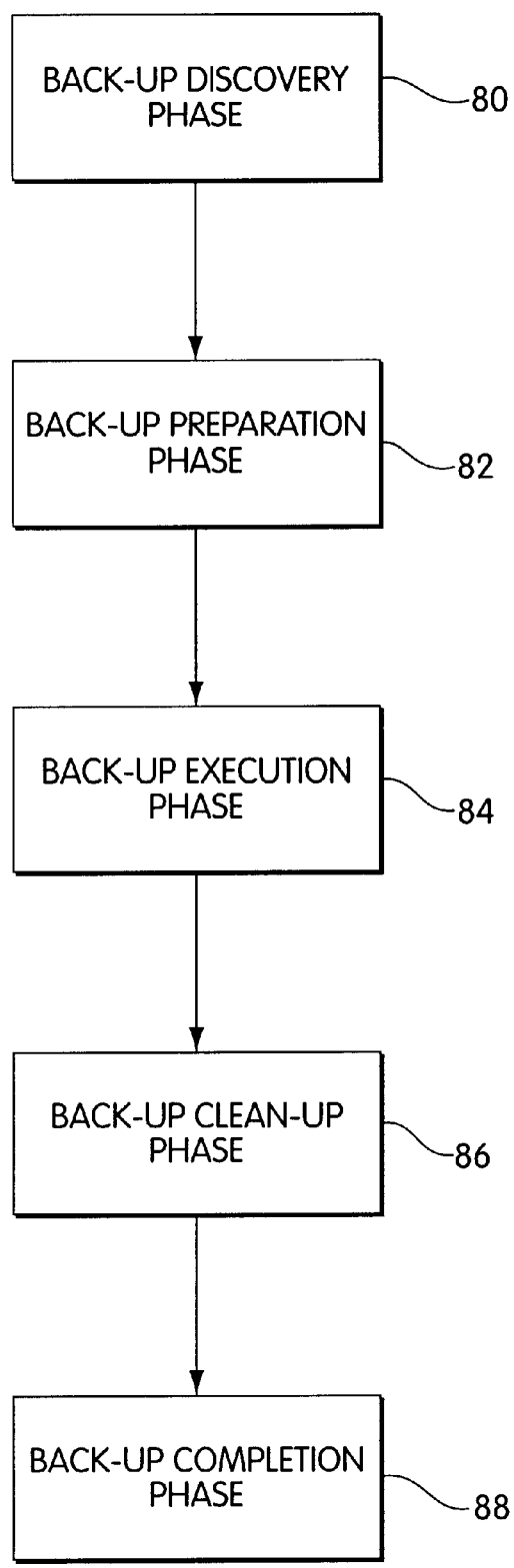
FIG. 8 illustrates one embodiment of a method for backing up data in a backup storage system.
Figure 9:
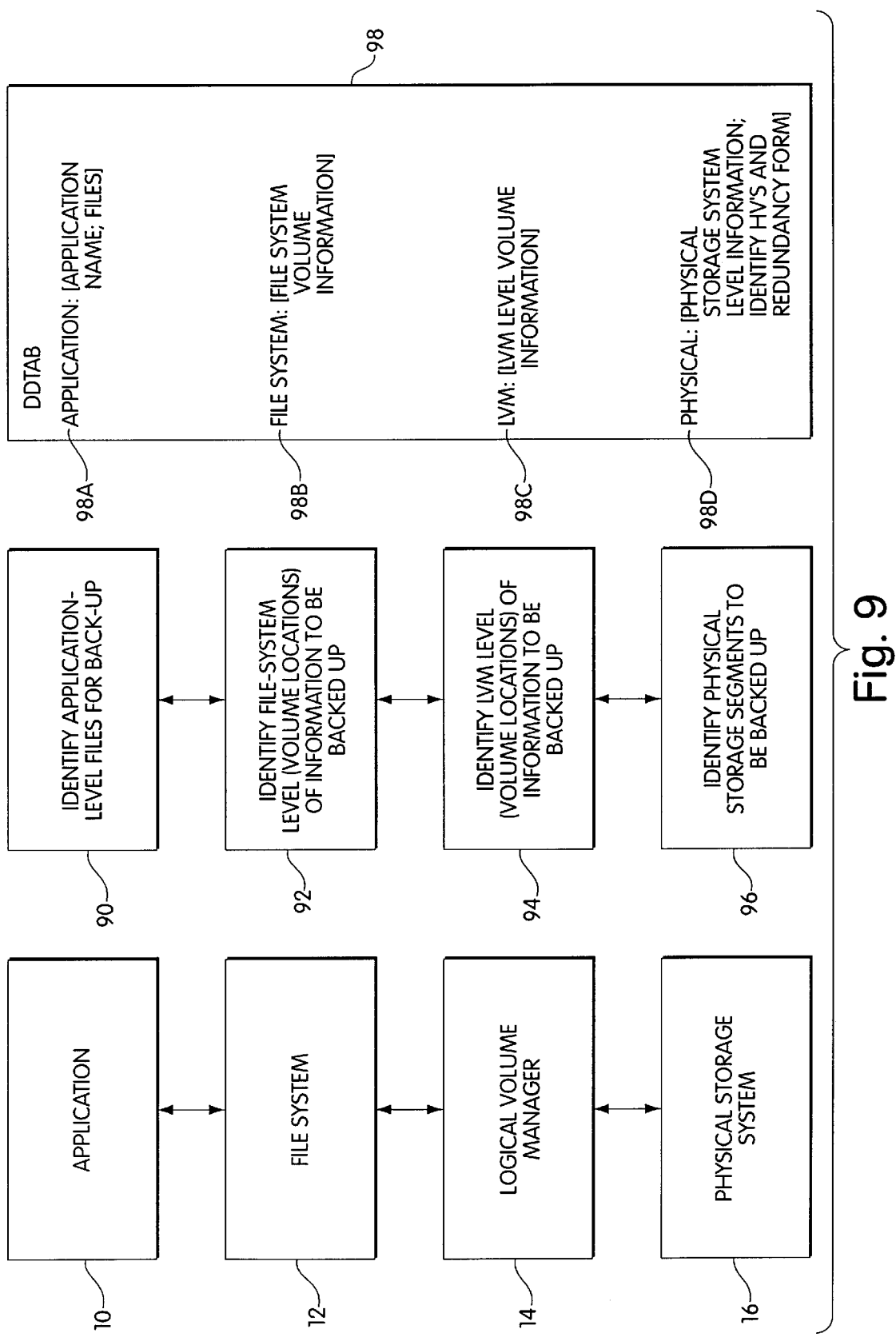
FIG. 9 illustrates one embodiment of a method for preparing a discovery data table for use in backing up data.
Figure 10:
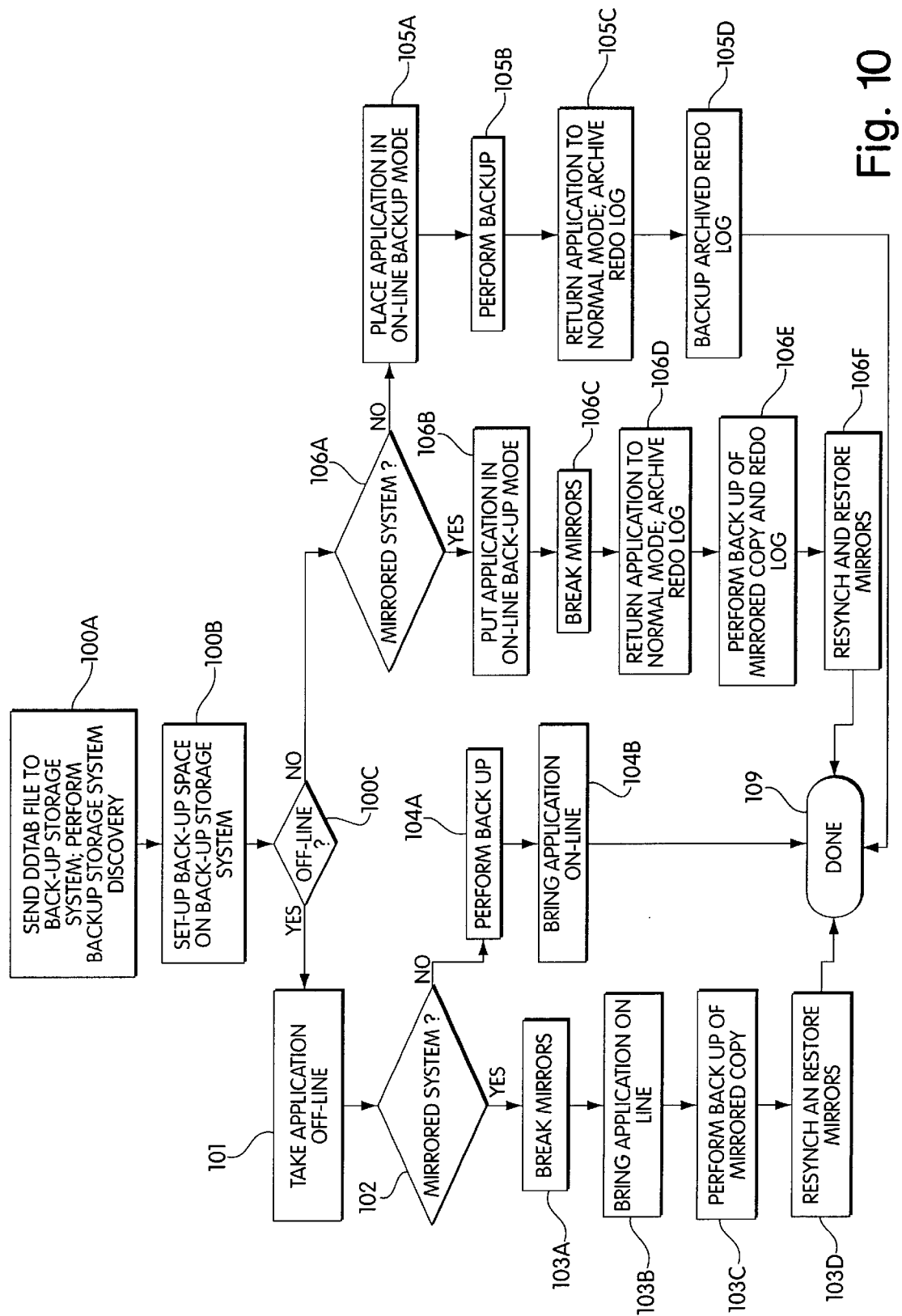
FIG. 10 illustrates one embodiment of a method for backing up data in a storage system.

In one embodiment, the level zero backup process may be performed as illustrated in FIGS. 8–10.

FIG. 8 illustrates one embodiment of a method of performing backup using the system illustrated in FIG. 6 and over the direct connection 60. The method begins at a step 80, where a discovery process is performed. In the discovery process, software identifies the physical storage segments (e.g., hyper-volumes, or portions of hyper-volumes) that are required to be backed up. This process is discussed in greater detail below. The software that performs the discovery phase may be located on the client 50, the storage system 52 or through an independent controller (not shown). Alternatively, custom or semi-custom hardware may be used to perform some or all of these functions.

At a step 82, a backup preparation phase process is performed. This backup preparation phase places the storage system 52 into a state permitting backup to be performed. The backup preparation phase step 82 is discussed in greater detail below.

At a step 84, a backup execution phase process is performed. In this step, the actual backup of the physical storage identified at step 80 is performed. The hyper-volumes are copied from storage system 52 over the direct connection 60 to the backup storage system 54. For example, hyper-volumes may be transferred from a Symmetrix storage system 52, over a SCSI cable, to an EDM unit. The EDM unit may then control storing the backed up hyper-volumes onto a tape media.

At a step 86, a backup cleanup phase is performed. The cleanup phase restores the storage system 52 to its full operational condition, as described in greater detail below.

At a step 88, the backup process is completed and any remaining network or backup monitoring is performed (such as reporting results and logging information in a log file).

FIG. 9 illustrates one embodiment of a method for conducting the discovery phase (steps 90–96) and a resulting discovery data table ("DD-TAB") 98. This process may be explained using the example of memory abstraction levels described with reference to FIG. 1.

At the application level 10, the discovery phase begins at a step 90 by identifying application level files to be backed up. For example, if the application is an Oracle data base program, the Oracle data base program would identify the constituent components of the data base which needs to be backed up (e.g., all the files for a complete database backup or only those files required for backing up table spaces or portions of table spaces). When the application level files have been identified, a corresponding entry is made into the DD-TAB file 98, indicating the application name and files, as illustrated at 98a. Other application level details may be included in the DD-TAB file 98, the DD-TAB file 98 shown in FIG. 9 being only illustrative.

Once the particular application level files have been identified, at a step 92 and corresponding to the file system level 12, the file system level information is identified. This identification process determines the (file system level) volume locations of the information to be backed up. A corresponding entry 98b in the DD-TAB file 98 is made for the file system information.

At a step 94 and corresponding to the logical volume manager level 14, the logical volume manager level information is determined for the information to be backed up. Again, this may correspond to volume locations, but is one step closer to the manner in which the information is physically stored on the physical storage system 52. As above, the logical volume manager level information 98c is stored in the DD-TAB file 98.

Finally, at a step 96 and corresponding to the physical storage system level 16, the actual physical storage segments (e.g., hyper-volumes) to be backed up are identified. Similar to the above, the physical storage information 98d is stored in the DD-TAB file 98. This information may include an identification of the hyper-volumes and the form of redundancy used (e.g., mirrored information or another RAID redundancy system). In some cases, the hyper-volume information may specify a smaller region within the hyper-volume where data is stored.

Thus, the steps 90–96 may be similar to the methods that an application running on a client 50 would use to access data stored in a physical storage system 52. That is, the application determines the particular files that are to be accessed, the file system and logical volume manager determine the virtual location(s) of the file and the physical storage system level determines where within the physical storage system that data is stored (e.g., which hyper-volumes include information for the file).

The steps 90–96 may be performed using software resident on the client 50, storage system 52, the backup storage system 54, on a separate processing component dedicated for this purpose or through some other mechanism. In addition, various steps might be performed by software components located in different places. For example, step 90 (at the application level) may be performed on the client; step 92 (at the file system level) may be performed on the client 50; the logical volume manager level step 94 may be performed on the client 57; but the step 96 of identifying physical storage segments might be performed on the storage system 52.

The actual backing up of the data may be controlled by the backup storage system 54. In particular as described above, if the DD-TAB file 98 has been sent to the backup storage system 54, the backup storage system 54 will know which hyper-volumes need to be copied from the storage system 52, and can directly read that data over the direct connection 60.

Returning to FIG. 8, a backup preparation phase may be performed at step 82 before performing the actual execution. In addition, a clean up phase 86 may be performed after execution of the backup.

FIG. 10 illustrates one embodiment for performing these tasks. At a step 100a, the DD-TAB file is sent from the client 50 or physical storage system 52 to the backup storage system 54. As described below, the DD-TAB file can be used to determine what physical storage segments on the physical storage system 52 need to be backed up and what backup storage space needs to be made available to receive a copy of the data from those physical storage segments. In the embodiment of FIG. 6, the DD-TAB file may be sent from the client 50 to the backup storage system 54 over the network 56.

The backup storage system 54 may then build its own layered representation of the backup information, e.g., create its own DD-TAB file, but building it from the physical storage level (98d) up. Thus, the backup storage system 54 may begin with the hyper-volume information from the communicated DD-TAB file 98 and build corresponding LVM, file system and application level representation of the backed up data. Thus, when a restore is later requested, the backup storage system will have a record specifying where the data is stored on the backup storage system 54 memory system and how that is intended to correspond to the physical, virtual and logical memory structure of the client 50 and the storage system 52.

At a step 100b, the backup space on the backup storage system is allocated and prepared to receive the information to be backed up from the storage system 52, such as preparing a tape storage unit to receive the backup information. The space may be allocated based on the information in the DD-TAB file. Thus, if the DD-TAB file lists a set of hyper-volumes (or areas within hyper-volumes), a corresponding amount of space may be allocated on the backup storage system 54. In one embodiment, any redundant information (e.g., RAID parity information) is copied and backed up, as though it were data. In other embodiments, only user data is copied to the backup storage system 54.

At a step 100c, it is determined whether the backup will be off-line. An off-line backup does not allow the application running on the client 50 to read or write any data into or from an area of memory that is to be backed up during the backup process. If the backup is to be performed on-line, the application is permitted to read and write data from the memory that is to be backed up, during all of the backup process.

Assuming that the backup is to be performed off-line, at a step 101 the application is taken off-line.

At a step 102, it is determined whether the backup information is stored in a mirrored redundancy group.

If not, at a step 104a, the backup is performed. After the backup has been performed at a step 104b, the application can be brought back on-line and processing is complete (at a step 109).

If the off-line (step 100c) backup is being performed on a mirrored system (step 102), then the mirroring is "broken" at a step 103a. "Breaking" the mirrors severs the normal mirroring procedures (breaks the mirror links) in the storage system 52 for at least one of the copies of the mirror. In this embodiment, the mirrors are broken while the application is off-line to avoid the risk of data being written to some of the mirrors, but not all of the mirrors, while the mirrors are being broken. For example, the data to be backed up may exist on six different physical storage segments (hyper-volumes). In this case, six mirrors must be broken. The application is taken off-line while the mirrors are broken to avoid the risk (for example) that a write to all six of the hyper-volumes may occur after three of the hyper-volume mirrors have been broken but before all have been broken. With the application on-line, there is a risk that the data on some of the hyper-volume segments would be updated while the data on others would not.

At a step 103b the application is brought on-line. This permits the application to continue processing using a primary copy of the hyper-volumes (or copies, where there is more than two copies of data in the mirror group) while the backup is performed using the mirror copy that has been taken out of the mirror redundancy group.

After the backup has been performed, at a step 103d, the mirrored volumes can be brought back into the mirror redundancy group. This is done by resynchronizing the mirror volumes that were taken off-line and restoring the mirror connection. The backup processing may then be complete at step 109.

If the backup is to be performed on-line (step 100c), then it is first determined whether the backed up data is part of a mirror redundancy group, at a step 106a.

If not, the application is placed in on-line backup mode, at a step 105a. Thus, for example, if the application is the Oracle database, writes to data can be stored in a redo log, rather than done by writing to the physical storage system 52 storage components (e.g., 76a–76d and FIG. 7). This step effectively prevents any writing of information to the physical storage segments (e.g., hyper-volumes) from interfering with the backup process for that period of time.

At a step 105b, the backup is performed. At a step 105c, the application is returned to its normal mode of operation and a redo log (now representing a log of what needs to be done to the applicable hyper-volumes as a result of the application having been placed in backup mode at step 105a) is archived. At a step 105d, the archived redo log is backed up to the backup storage system 54, and processing concludes at step 109.

If the on-line backup is being performed in a mirror redundancy group (steps 100c and 106a), the application is put into an on-line backup mode, at a step 106b.

After the application has been placed in an on-line backup mode, the mirrors may be broken, at a step 106c (corresponding to the breaking of mirrors at a step 103a).

At a step 106d, the application may be returned to normal mode and the redo log (now representing a log of what needs to be done to the applicable hyper-volumes as a result of the application having been placed in backup mode at step 106b) is archived.

The backup may then be performed using the mirrored copy at a step 106e.

After the backup has been performed, the mirrors may be resynchronized and the mirror facilities on the storage system 52 restored so that the mirrored copy is brought back into normal use. Processing may then be completed at step 109.

Tracking Data Changes (Step 72 of FIG. 7).

The step 72 may be performed at either the logical or the physical level. At the logical level, the client 50 may track the segments that include changed data. At the physical level, the storage system 54 may track which segments of data have been changed. In either case, the segments of data may correspond to physical segments of data that are stored on the storage system, rather than units of data (e.g., files within a partition) determined at the logical level and associated with a logical construct.

The physical segment may be a 512 byte block that is written to or read from the physical storage device at one time. In another embodiment, the granularity of the physical segment may be the amount of data stored in a track of the physical storage devices used (particularly when the physical storage devices are disk drives). The size of this may depend on the particular format for storing data in applicable operating system. For example, in a fixed block architecture environment, the track may be 32 kilobytes (64 SCSI blocks). On IBM main frames implementing a count-key-data ("CKD") system, the track size may be the size of one CKD track.

In certain embodiments, the changed segments may be tracked at the physical storage level. Thus, whenever a physical segment is written to a physical storage device, the fact that the segment was changed can be recorded. This may be done using a single bit associated with each physical segment. When the system is initiated, all of the bits are set to zero (for example). When a physical segment is changed (or written), the associated bit may be set.

Thus, referring again to FIG. 2B, data changes may be tracked at the level of the actual physical storage devices 204–206. When data is changed in one of the data segments, a bit may be set (or some other mechanism used) to track that that segment has been changed. For example, if data is changed within the first segment of the application file at the application level, e.g., 203a, the data in actual physical storage device at 208 will be modified. A bit (or other mechanism) associated with data segment 208 will be set when this write is performed.

Figure 11:
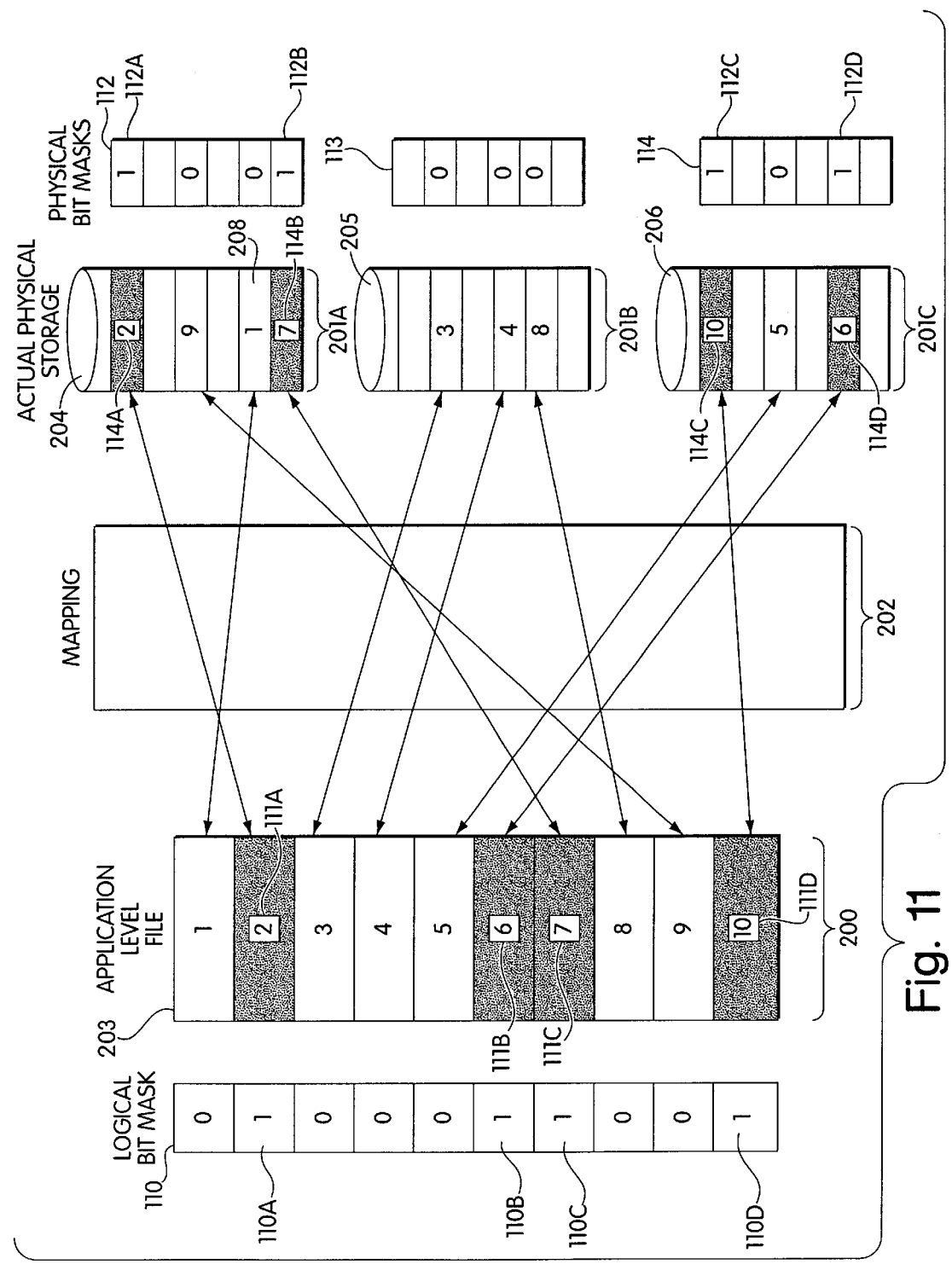
FIG. 11 illustrates an example of tracking changes at the physical level and converting those changes to a logical level.

FIG. 11 illustrates one example of a system that includes a bit associated with physical storage segments. For example, physical storage device 201a includes six physical segments. An associated physical bit mask 112 sets a bit for each physical segment that has been changed. In this example, segments 114a and 114b have been changed. Accordingly, the associated bits 112a and 112b of the physical bit mask 112 have been set to one. On inquiry, the physical bit mask may be read and output to a client (e.g., client 50 of the system illustrated in FIG. 5).

The actual physical storage devices 204–206 may, but need not, have any idea of what is being done at the application level. In this embodiment, the physical storage devices need only be aware that data within the applicable segment of data (e.g., 208) is being modified.

(While many of the embodiments described herein use bit masks to represent changes in data, e.g., a physical bit mask or a logical bit mask, other mechanisms (lists being just one example) may be used.)

Backup of Changed Data (step 74 of FIG. 7).

Figure 1:
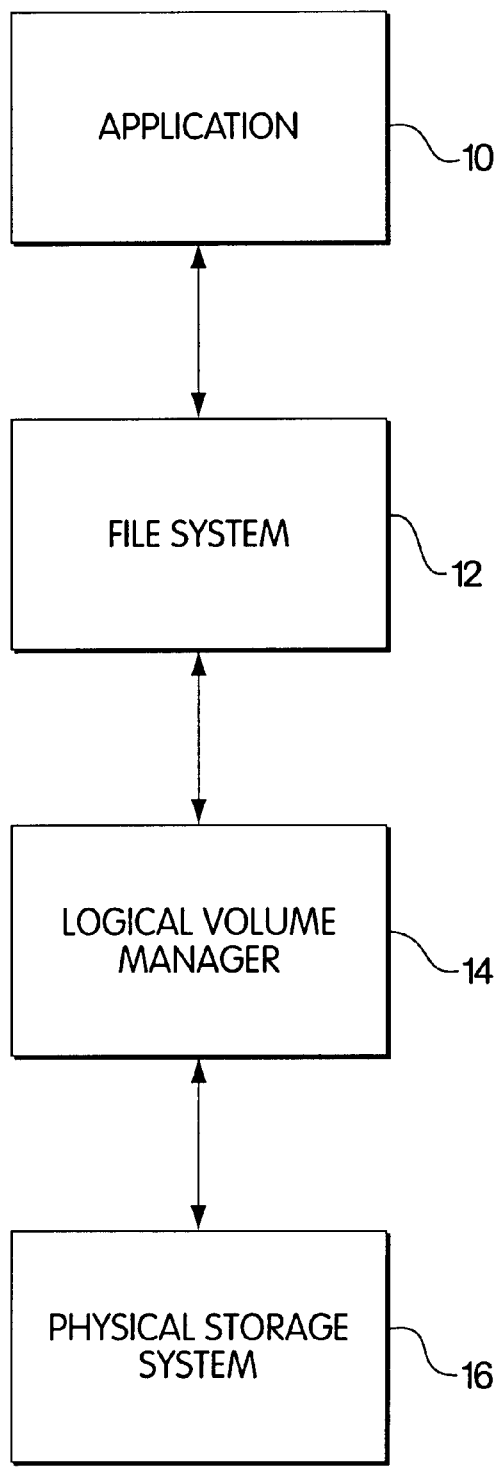
FIG. 1 illustrates an example of conversion of application level data to storage in a physical system and vice versa.

In an embodiment described above, the changes to data segments are tracked at the physical storage level (although, in alternative embodiments, the changes could be tracked at any of the other levels, e.g., the application level, file system level, logical volume or logical volume manager level, as illustrated and discussed with respect to FIG. 1).

In one embodiment of performing a "differential" backup, data about changes at the physical level is converted to correspond to changes at the logical (e.g., application file level) level. The differential backup then stores the data at the logical level.

FIG. 11 illustrates one way of tracking changes at the physical level and converting that to the logical level. In this embodiment, a bit mask 112, 113 and 114 is associated with each actual storage device 204–206.

When data is written to a data segment, a corresponding bit and the corresponding physical bit mask is changed from a zero to a one. Accordingly, at any point in time, the physical bit masks indicate all of the data that has been changed since the last backup. As described above, the actual physical storage devices 204–206 may not know how this corresponds to logical elements at the application level. Indeed, the actual physical storage devices may have no way to determine what data segments are associated with each other. As indicated in FIG. 11, in this embodiment, data segments 114a–114d have been changed. Accordingly, corresponding bits 112a, 112b, 112c, 112d in bit masks 112, 113 and 114 have been set to one. (Other data segments in the actual physical storage devices may also have been changed, but are not shown in FIG. 11).

A logical bit mask 110 may be constructed, which indicates what data segments within the application level file have been modified. Thus, logical bit masks 110 may include entries 110a–110d indicating that the corresponding data segments 111a–111d have been altered. (In an alternative embodiment, the segment changes may be tracked at the logical level, even though the segment size corresponds to a physical storage amount, such as block or track size.)

The logical bit mask 110 can be constructed using mapping 202. In particular, the mapping 202 may convert the application level to a group of data segments in the actual physical storage (as this needs to be done to store the application level file in physical storage in the first place). Thus, the mapping 202 may be performed using the same mechanisms for mapping application level data into physical storage devices (through, e.g., levels 10, 12, 14 and 16 of FIG. 1). The physical bit masks associated with these data segments on actual physical storage may then be examined. A logical bit mask can be constructed by setting each entry in the logical bit mask to a one only where the actual physical storage device indicates that that data segment has been changed.

Figure 12:
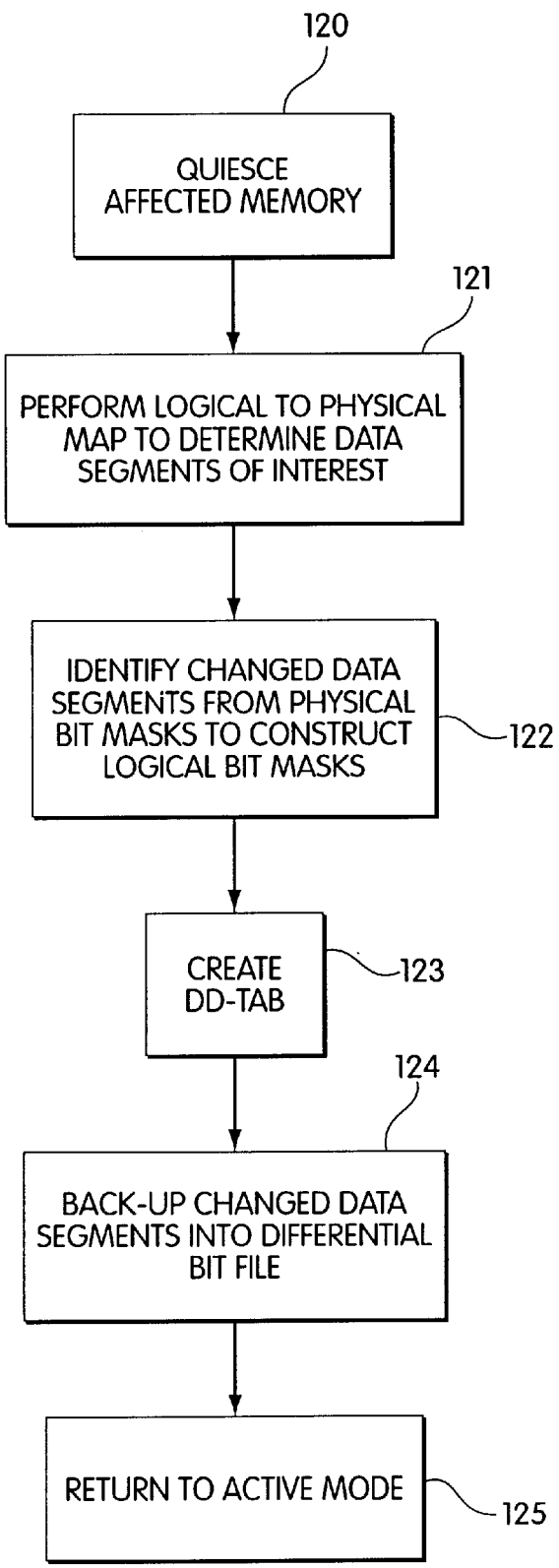
FIG. 12 illustrates one embodiment of a method for performing a differential backup.

FIG. 12 illustrates one embodiment of a method for performing a differential backup. In this embodiment, the effective memory in the actual physical storage system is first quiesced, at a step 120. Quiescing the memory simply assures that no additional data is modified within the application level file during the backup process. Quiescing may be performed as generally described above with reference to FIG. 10, e.g., by taking the application off-line or placing it in on-line backup mode.

At a step 121, a logical to physical mapping is performed to determine which physical data segments are of interest. Step 121 may be performed as generally described above. That is, using the application, file system and logical volume manager (where present, and additional levels if present) to map all of the data segments within the application level file onto physical storage. As described above, this may be a conversion all the way to actual physical storage. (In other embodiments, an additional level of mapping may occur before reaching the actual physical devices storing data. For example, if a Symmetrix product is used for storage, the Symmetrix products may present what appears to be a three volume storage device. The Symmetrix product could present change data (e.g., a physical bit mask) based on that three volume set. On the other hand, the way that the data is physically stored with in the Symmetrix may not correspond to that three volume view provided to the application or operating system level. Thus, an additional level of mapping for both data segments and bit masks may be performed.)

At a step 122, any data segments that have been changed since the last level zero backup (or other time mark such as the last differential backup) are identified. This may be done by examining physical bit masks associated with the actual physical storage devices. Any entry marking changed data in a physical bit mask that corresponds to one of the data segments within the application level file corresponds to a data segment that has been changed in the application file 203.

At step 122, a logical bit mask may be constructed, such as logical bit mask 110 of FIG. 11.

At a step 123, a DD-TAB file may be created. This may be done as generally described above (e.g., with reference to FIG. 9). In addition, the DD-TAB file may include a logical bit mask. In an alternative embodiment, the logical bit mask may be converted into another form of information reflecting what data has been changed. In one embodiment, a logical bit mask may be converted into a differential bit map, discussed below with reference to FIG. 13.

In one embodiment, steps 120–123 are performed primarily by software running on client 50 of FIGS. 5 and 6 (in coordination with the other system components; step 122, for example, may involve reading a physical bit mask from storage device 52). Such software may be referred to as a differential generator or restore controller, whether resident on one, or among more than one, of the client, backup storage system and physical storage system.

At a step 124, the changed data segments are backed up into a differential bit file. This may be done as generally described above with reference to FIGS. 8–10, except that only those data segments that have been changed are backed up. For example, the changed data segments may be sequentially read onto a backup tape within the backup storage system 54. An example of a differential bit file is described with reference to FIG. 13.

Finally, at a step 125, the system is returned to the active mode. That is, the system is allowed to continue updating data segments on the actual physical storage device.

As described above, before returning the system to active mode, the bits corresponding to the backed up data segments on the actual physical storage device may be reset to zero. This is only done if differential backups are being performed with respect to the last differential backup. Otherwise, the bits may only be reset after construction of a synthetic level zero backup (described below) or a true level zero backup.

Figure 13:
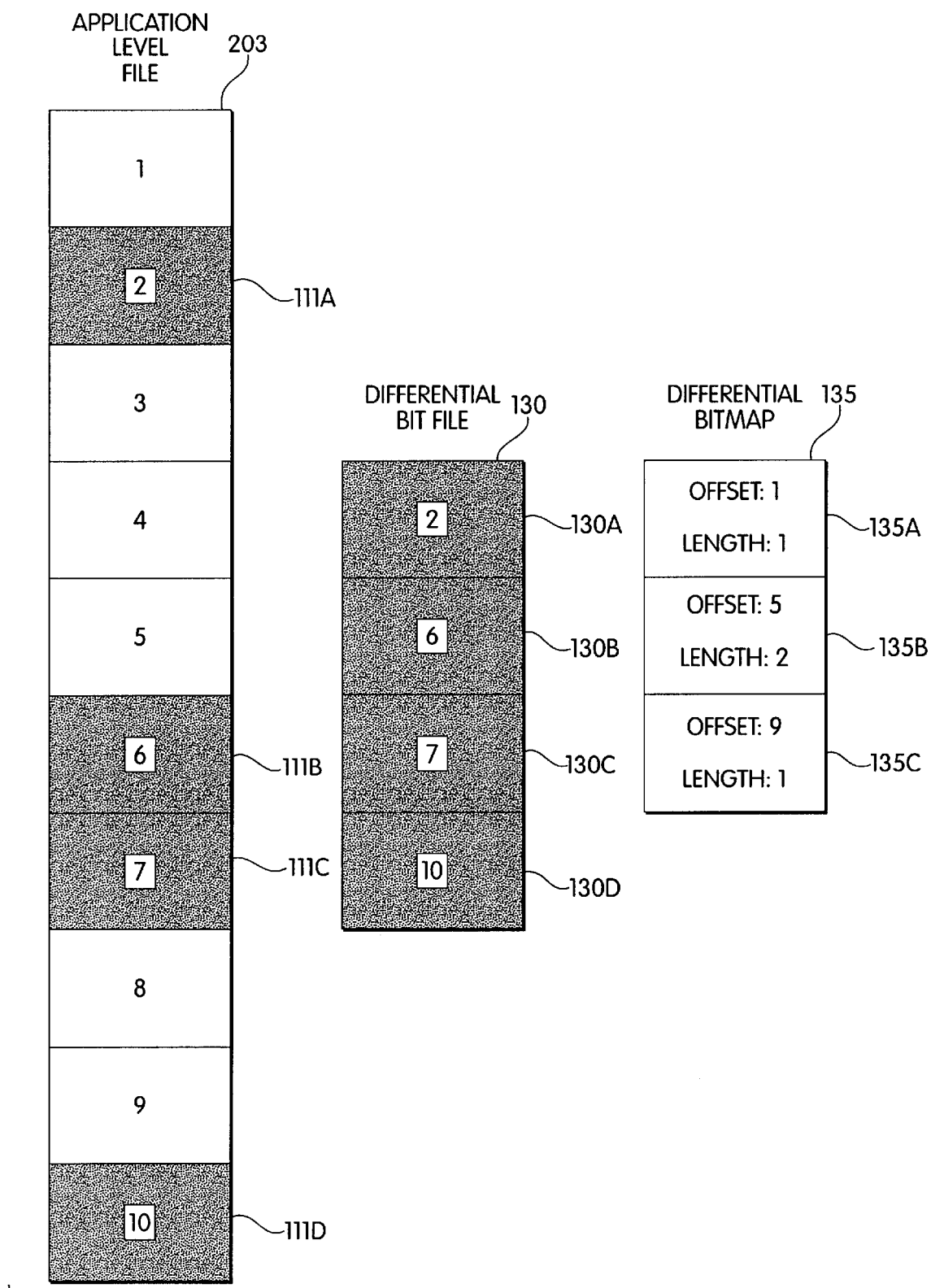
FIG. 13 illustrates an example of a differential bit file and a differential bit map formed in accordance with one embodiment of one aspect of the present invention.

FIG. 13 illustrates one example of a differential bit file and a differential bit map. As described above with reference to FIG. 11, an application file 203 includes data segments 111a–111d that have changed data. A differential bit file 130 may be constructed, including copies of only the changed data segments. This corresponds to copies of the data 111a–111d, stored in the differential bit file as 130a–130d. The differential bit file captures changes to a logical entity represented in a level zero backup. These changes are captured as contiguous (logical) extents (e.g., sequences of bytes) that may be mapped back into the level zero backup during restoration.

As described above, a logical bit mask may be included with the differential bit file. The logical bit mask would provide information about where the data segments within the differential bit file 130 belong within the application level file 203 (e.g., the first segment 130a of the differential bit file 130 corresponds to the second segment 111a of the logical element 203).

An alternative is to construct a differential bit map 135. The differential bit map may be used to map the segments in the differential bit file into the logical stream of bytes of a level zero backup. The differential bit map may include a listing of the off-set (e.g., off-set from the start) of each portion of data within the differential bit file, and the length. Thus, a first entry 135a may specify an off-set of one and a length of one. This corresponds to the data segment 130a and the differential bit file 103. The off-set of one indicates that the data begins one data segment into the application file 203 (the first data segment not having been modified and, therefore, not being included in the differential bit file 130). The length of one also indicates that a single data segment is being included as the first portion of the differential bit file 130. Of course, even in an embodiment where offset and length is used, other measures may be used to indicate length. For example, rather than indicating offset and lengths in units corresponding to the length of a data segment, other units may be used (such as bytes, data blocks or tracks).

Entry 135b of the differential bit map 135 corresponds to data segments 130b and 130c. In this example, the off-set of five indicates that the data in this portion of the differential bit file begins at the sixth data segment of the application level 203. The length of two indicates that two sequential data segments (111b and 111c) are stored within the differential bit file.

Finally, an entry 135c indicates that the last data segment in the differential bit file, 130b, is the tenth data segment in the application level file and has a length corresponding to one data segment.

Synthetic Level Zero Backup.

In one embodiment, data can be restored from the application level file or other logical element (e.g., a partition) by first constructing a synthetic level zero backup. A synthetic level zero backup is a regenerated copy of the complete logical element. Unlike a true level zero backup, however, the synthetic level zero backup is generated from an earlier level zero backup and a (or more than one) differential backup. Thus, the synthetic level zero backup corresponds to the state of the data at a time corresponding to the differential backup, which is more recent than the original level zero backup.

Figure 14:
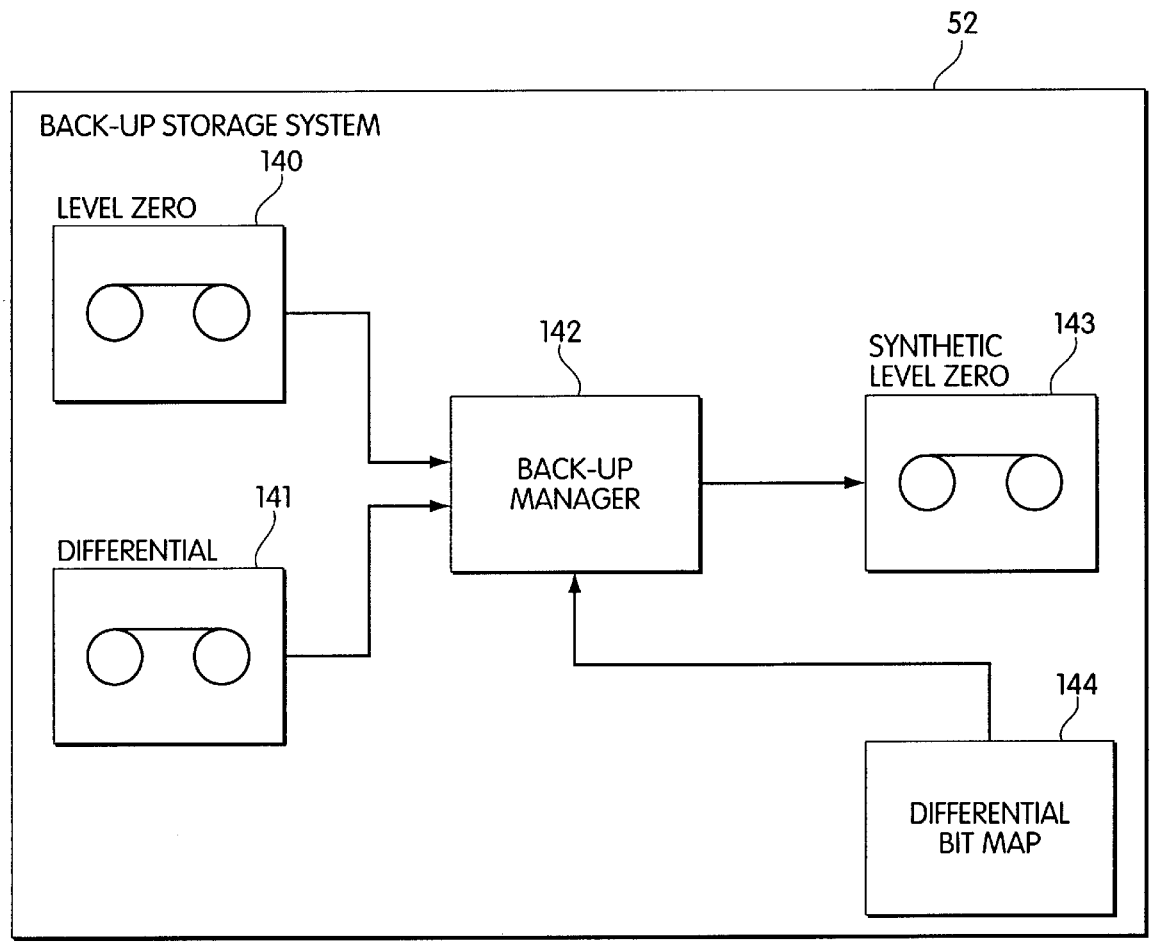
FIG. 14 illustrates one embodiment of a system that can generate a synthetic level zero backup.

FIG. 14 illustrates one embodiment of the system that can generate a synthetic level zero backup. In this embodiment, the synthetic level zero backup is generated by the backup storage system 52. The synthetic level zero process is managed and performed by a backup manager 142 within the backup storage system 52. The backup manager may be software running on a general purpose computer within the backup storage system 52.

In this embodiment, a level zero backup is stored on a tape unit 140. Similarly, a differential backup is stored in a tape unit 141. The process of creating a synthetic level zero backup, in this embodiment, generates a synthetic level zero backup onto a third tape 143.

To do this, the backup manager references a differential bit map 144, which may correspond to the differential bit map described above. The differential bit map 144 may be stored in a catalogue of information about backups, held in a computer memory of the backup storage system 52.

Figure 15:
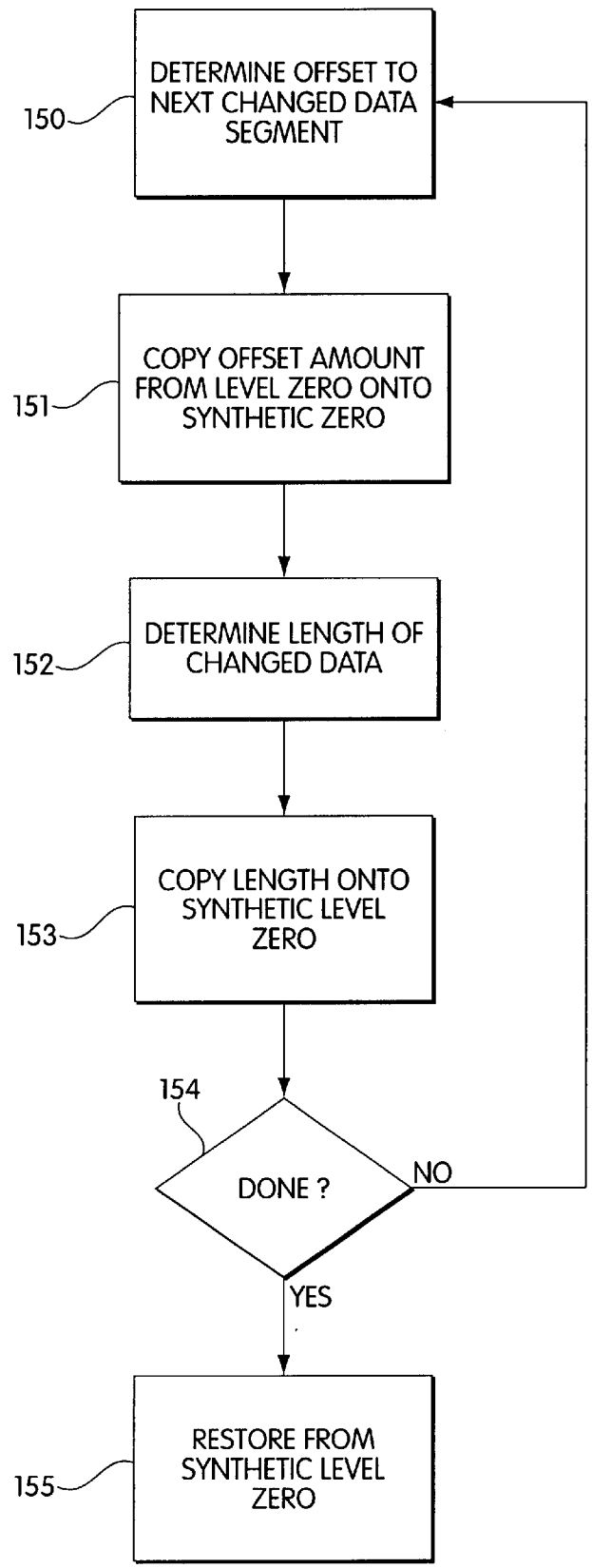
FIG. 15 illustrates one embodiment of a method for generating a synthetic level zero backup.

FIG. 15 illustrates one embodiment of a method for generating a synthetic level zero backup. In this embodiment, the method begins by determining the offset to the next changed segment of data. This may correspond to examine a differential bit map such as the differential bit map 135 of FIG. 13.

At a step 151, data is copied from the level zero backup onto the synthetic level zero backup, corresponding to the off-set. Referring again to FIG. 13, this would correspond to copying the first data segment of the application level file 203 into the synthetic level zero backup.

At a step 152, the length of changed data is determined. Referring again to FIG. 13, the length of the first changed data segment is one (as indicated at 135a).

At a step 153, the determined length of data is copied onto the synthetic level zero. Accordingly, referring again to the example of FIG. 13, the data segment 130a is copied form the differential bit file 130 into the synthetic level zero backup 143.

At a step 154, it is determined whether the backup is done (i.e., whether the entire logical element, such as application level file 203, has been regenerated into the synthetic level zero backup). If not, processing continues at step 150.

If so, a new synthetic level zero backup has been created. At a step 155, data may be restored from the synthetic level zero backup. This synthetic level zero backup corresponds to a bit file such as the bit-file generated during a conventional level zero backup. Accordingly, the synthetic level zero backup may be used to restore some or all of the logical element in the manner known for regular level zero backups. The synthetic level zero backups may be generated at the time the differential backup is performed or later, e.g., when a restore needs to be performed for that time.

In this example, only one differential backup file is used. This corresponds to the scenario where differential backups include all data changed since the last level zero backup.

As described above, however, differential backups may be performed based on changes in data since other differential backups. In this case, according to one embodiment, generation of a synthetic level zero backup may be similar to that described above. A series of synthetic level zero backups could be constructed using each of the involved differential files. Thus, the oldest differential backup would be used to create a synthetic level zero backup. This synthetic level zero backup would then be used, with the next oldest differential backup, to generate a new synthetic level zero backup. This process may continue, until the most recent differential backup of interest has been incorporated into the synthetic level zero backup.

A more efficient method of generating a synthetic level zero backup in the presence of more than one differential backup could be as follows. The backup manager 142 could step through each of the data segments in the logical element (e.g., each data segment in the application file 203). The backup manager 142 could then determine which of the potential sources of backed up data has the most recent version of the data segment. If no differential backup has a corresponding copy of the data segment, the data segment is copied from the original level zero backup into the synthetic level zero backup. If any of the differential backups is storing an updated copy of the data segment, only the differential backup having the most recent version of the data segment (that is old enough for the restore being performed) is used to copy that data segment into the synthetic level zero backup (any other versions of the data segment having been replaced).

Undo

Conventionally, restoring a logical element to an earlier state is performed by copying a complete level zero backup from a backup system onto the primary system copy of the logical element. In certain embodiments of the present invention, a synthetic level zero backup may be copied to the primary system copy of the logical element.

Figure 16:
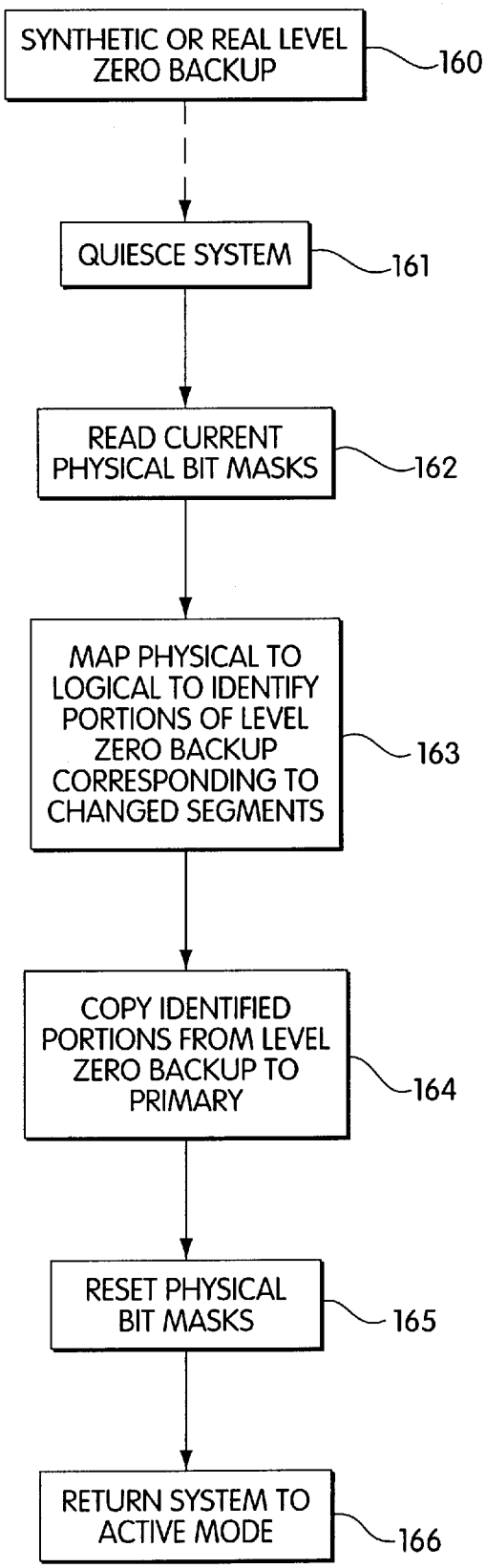
FIG. 16 illustrates one embodiment for undoing changes to a primary system copy of a logical element using a differential backup.

In another embodiment of the present invention, a complete copying of the synthetic or real level zero backups can be avoided. In this case, only physical storage segments that have been changed since the last backup point are restored. Thus, if the primary system copy of a logical element is to be rolled back to the point in time when a real level zero backup was taken, only those segments of data that have been changed since the backup are copied from the backup (e.g., a real or synthetic level zero backup) to the primary system copy. Physical storage segments that have not been changed since the backup need not be copied onto the primary system copy—they have not changed. As a result, by restoring only changed data segments, the changes are "undone." Accordingly, this method for restoring the primary system copy of a logical element to its earlier state may be referred to as "undoing" the changes. FIG. 16 illustrates one embodiment of a method for undoing changes to a primary system copy of a logical element.

At a step 160, the synthetic or real level zero backup is made. This backup corresponds to the point in time to which the primary system copy is to be restored. (In other embodiments, however, the undo may be performed directly from differential backups.)

At a step 161, the system is quiesced. This may be performed as described generally above with reference to step 120 of FIG. 12 and with respect to FIG. 10. Quiescing the system assures that changes are not made to the affected area of memory. (Before restoration is attempted the system may also verify that no changes have been made to the physical-logical mapping.)

At a step 162, the current physical bit masks are determined. Referring again to FIG. 11, this corresponds to reading (the appropriate portions of) physical bit masks 112, 113, and 114. These physical bit masks indicate which physical storage segments have been changed since the synthetic or real level zero backup of step 160.

At a step 163, the portions of the level zero backup that correspond to the changed data segments are identified. This is done by mapping from the physical bit mask level to the logical level. Referring again to FIG. 11, the physical bit masks 112, 113, and 114 are mapped into the corresponding segments of data in an application level file 203. Thus, using the example of FIG. 11, the changed data segments 114a, 114b, 114c, and 114d, which are reflected in the set bits of the physical bit masks, 112a, 112b, 112c and 112d are mapped into a logical bit mask 110, that includes set bits 110a, 110b, 110c, and 110d. This logical bit mask 110 identifies those data segments 111a–111d of the application level file 203 that have been changed since the synthetic or real level zero backup of step 160. The mapping process may be performed as described above, for example, a logical to physical mapping may be performed (like when data is saved by the application). This identifies which segments at the logical level corresponds to which segments in physical storage. Once identified, the reverse (physical to logical) mapping is also known.

At a step 164, the corresponding portions of the stored, backed up application level file 203 are copied from the level zero backup to the primary system copy on the actual physical storage devices. Returning again to the example of FIG. 11, the data segments 111a–111d of the application level file 203, as stored in the synthetic or real level zero backup of step 160, are copied into the respective portions of the actual physical storage devices 204–206 (in the physical storage segments 114a–114d). Identification of the segments of data within the copy of the application level file 203 that are to be copied can be performed as generally described above with reference to FIG. 15. That is, the offset to the data can be determined using the number of data segments that need to be traversed before encountering the changed data segment, and then taking that amount of data that corresponds to the physical segment of storage.

At a step 165, the physical bit masks are reset, to reflect the fact that the synthetic or real level zero backup of step 160 now reflects the primary system copy of the logical element. In some cases, it is possible that more than one logical construct has data stored on a physical segment (e.g., track). In this case, the bit should not be reset, because this could prevent the bit from reflecting changes to the other logical construct. As a result, it will always appear that data on this physical segment has been changed and the track will always be backed up whether or not the track was actually changed.)

At a step 166, the process concludes by returning the system to the active mode.

While the embodiment of FIG. 16 performs the undo from a synthetic or real level zero backup, other embodiments need not go through a step of constructing a synthetic or real level zero backup. As with the earlier embodiments, a catalogue of differential backups may be maintained. In this circumstance, the appropriate backup copy of a physical segment may be selected. That is, the copy of the physical segment in the differentially backed up copies may be selected.

Figure 17:
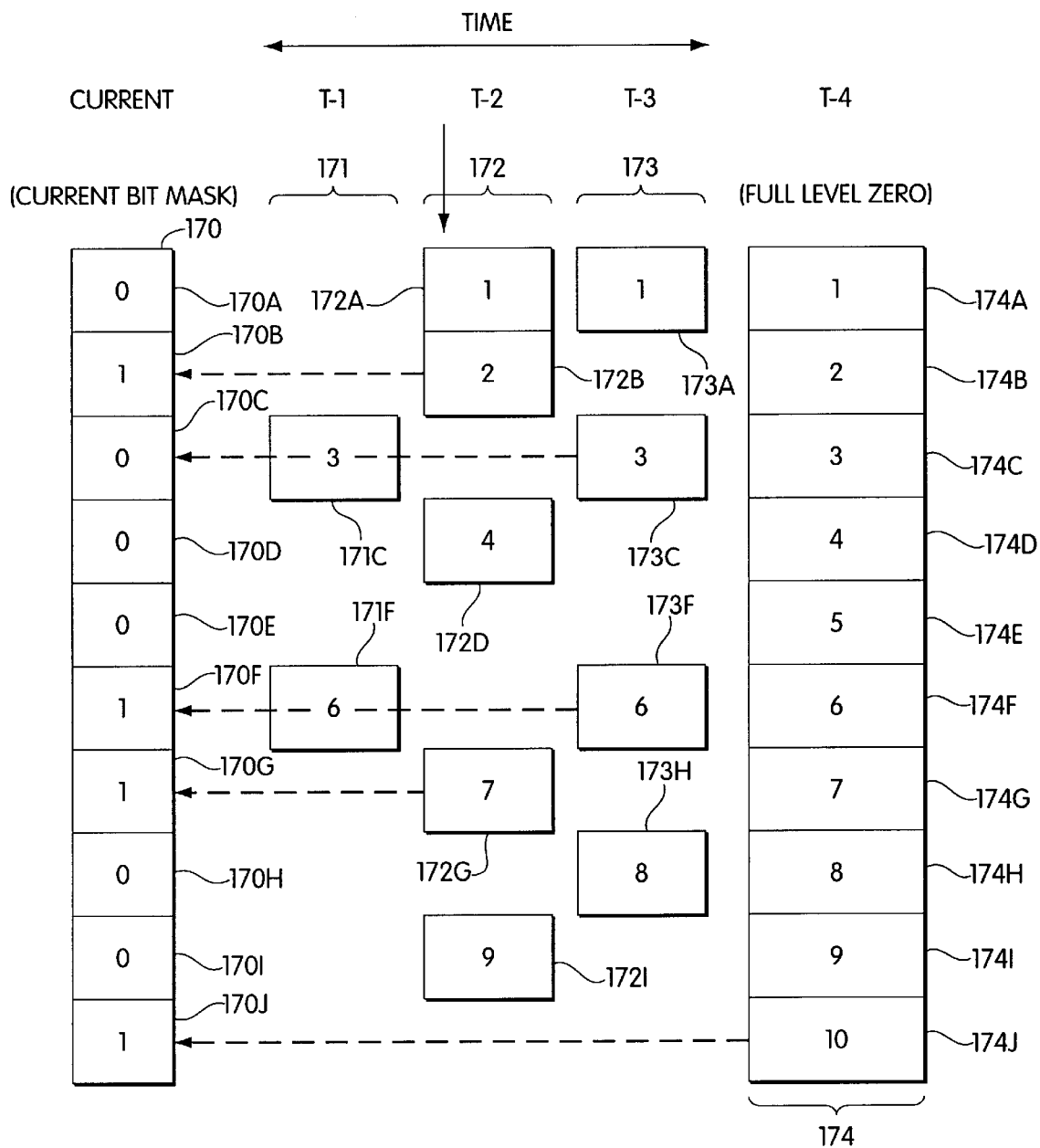
FIG. 17 illustrates one example in accordance with one embodiment of a method for performing an undo in a system where multiple differential backups are kept.

FIG. 17 illustrates one example of performing an undo in a system where multiple differential backups are kept. In this example, an initial full level zero backup (or synthetic level zero backup) 174 has been generated. This backup corresponds to the state of the primary memory of a logical element at a time T-4. The logical element has ten segments of memory (corresponding in size to the physical segments in which the logical element is stored 174a–174j).

At a time T-3, a differential backup 173 was made. This differential backup stores the segments of memory corresponding to the first, third, sixth and eighth portions of the logical element 174, as indicated by the segments 173a, 173c, 173f and 173h. In the illustration of FIG. 17, there are spaces shown between these segments. In the actual backed up data, as described above, these segments may be stored contiguously.

Similarly, at a time T-2, another differential backup 172 is saved. This differential backup stores only those changes in the logical element that have occurred since time T-3. In other words, in this embodiment, the physical bit mask was reset when the differential backup was performed at time T-3. This reset bit mask may then be used to determine what corresponding memory segments (172a, 172b, 172d, 172g, and 172i) need to be stored in this differential backup.

Finally, at a time T-1, another differential backup 171 is stored.

In addition, further changes may have been made to the logical element since the time of the backup at T-1. In this case, again assuming in this embodiment that the bit mask is reset at the time of each differential backup, a current bit mask 170 indicates which physical segments have been changed since time T-1. The bit mask 170 in the example of FIG. 17 is a logical bit mask. Accordingly, the set bits 170b, 170f, 170g and 170j indicate that segments 174b, 174f, 174g, and 174j in the logical element have been changed to since the differential backup was performed at time T-1.

Continuing with the example of FIG. 17, assume that there is a desire to restore the primary copy of the logical element to its state at time T-2.

For the first segment of the logical element, corresponding to segment 174a of the full (synthetic or real) level zero backup, the current bit mask 170a indicates that it has not been changed since time T-1. In addition, the differential backup 171 also indicates that the first (first at the logical level) segment has not been changed between the time T-1 and T-2. That is, there is no entry in the differential backup log 171 recording changed data for that segment. Accordingly, no data needs to be copied from any backup to the current primary copy.

The current bit mask bit 170b, however, indicates that data in the second segment 174b has been changed. Accordingly, data needs to be copied into the current primary copy to return it to its state at time T-2. Since the backup 172 includes data for that segment 172b, this may be copied into the physical storage segment of the current primary system copy. For the third segment, corresponding to 174c, the current bit mask indicates that the segment has not been changed since the time T-1. There is, however, an entry in the differential backup 171 indicating that this data was changed between the time T-1 and T-2. Accordingly, the primary copy of the data includes information more recent than time T-2. As a result, this corresponding segment needs to be returned to its state at the time T-2. There is no backup for this segment in the differential backup for time T-2 172, accordingly, an earlier backup needs to be used. In the differential backup 173 for time T-3, there is a differential backup 173c for this segment. Accordingly, this segment may be copied into the primary copy.

Similarly, the current bit mask bit 170f is set for the sixth segment of the logical element. Accordingly, this segment needs to be updated. The sixth segment 173f of the differential backup 173 includes the data as it existed at time T-2 in the system. Accordingly, data may be taken from this differential backup 173f and copied to the physical storage system.

As the last example of restoring segments within this logical element, the current bit mask bit 170j is set, indicating that the tenth segment of the logical element (corresponding to 174j of the full level zero backup at T-4) has been changed. As there are no differential backup storing the tenth element, it may be taken from the full (synthetic or real) level zero backup 174. Accordingly, the data in the full level zero backup for this segment 174j is copied to the primary copy.

After these updates have been performed, (including the indicated copying of segments 173f and 172g to the primary copy for the system), the primary copy for the system has been restored to its state at the time T-2 (when the differential backup 172 was performed). As described generally above, a catalogue may be maintained showing which segments of the logical element are stored in each differential backup. Accordingly, the above determinations can be performed using this catalogue, without actually having to access the differential backups to determine which differential backups stores the desired data for this particular restore operation.

Figure 18:
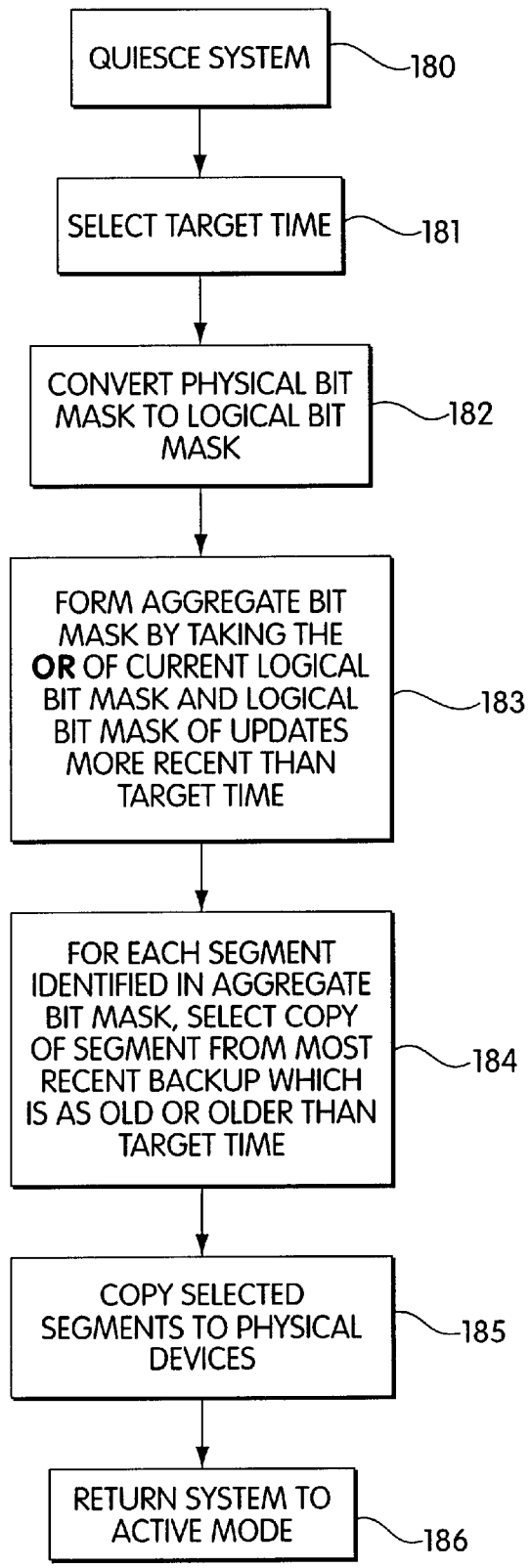
FIG. 18 illustrates one embodiment of a method for performing an undo from a series of differential backups.

FIG. 18 illustrates one embodiment of a method for performing an undo from a series of differential backups performed since a full level zero backup (as in the example of FIG. 17).

At a step 180, the affected memory is quiesced, as generally described above.

At a step 181, a target time is selected, e.g., a corresponding differential backup is selected as the restore state. In the example described above with respect to FIG. 17, the target time T-2 was selected.

At a step 182, the physical bit masks corresponding to the relevant portions of storage for the logical element being restored are converted to a logical bit mask. In the example of FIG. 17, this results in the current bit mask 170.

At a step 183, an aggregate bit mask is formed. This is done by forming the logical OR of the current logical bit mask with logical bit masks corresponding to each differential backup that is more recent than the target time. Referring again to FIG. 17, this would require OR'ing the current bit mask 170 with a bit mask for the differential backup 171, taken at time T-1. The bit mask for the differential backup 171 would have bits set only for the third and sixth segments of the logical element, corresponding to the updated information 171c and 171f stored in the differential backup 171. The aggregate bit mask, therefore, has a bit set corresponding to each segment in the logical element that needs to be restored.

At a step 184, for each segment identified in the aggregate bit mask, the copy of the segments stored in the remaining differential backups or full level zero backup which correspond to the state of the system at time T-2 are selected. This may be achieved by selecting a copy of the segment from the most recent differential backup that is older than the target time. Referring again to the example of FIG. 17, the most recent version of the segment from among differential backups 172 and 173 and full level zero backup 174 are selected for the corresponding bits set in the aggregate bit mask. Thus, segment 172b is selected—it is the most recent segment stored that is at least as old as the target time T-2. Similarly, segment 173f is selected for the update. Although there is a more recent version of this data stored in the differential backup 171 at 171f, the data at 171f is too recent.

At a step 185, the selected segments are copied to the physical devices at the physical locations corresponding to the replaced segments. This may again be done as generally described above, by mapping the logical level segments to the physical level locations.

After this has been performed, the primary system memory should reflect the state of the system at the target time. Accordingly, the system can be returned to its active mode.

Differential Backup of Data Before Updating the Data

In some circumstances, a backup of a primary system copy of data is available at the time a differential backup is performed. In the above embodiments, data that had been changed is backed up. In an alternative embodiment, a differential backup is performed by saving copies of data to be changed, rather than saving new copies of data after it has been changed. This concept is most easily understood with the example of FIGS. 19A–19C.

Figure 19A:
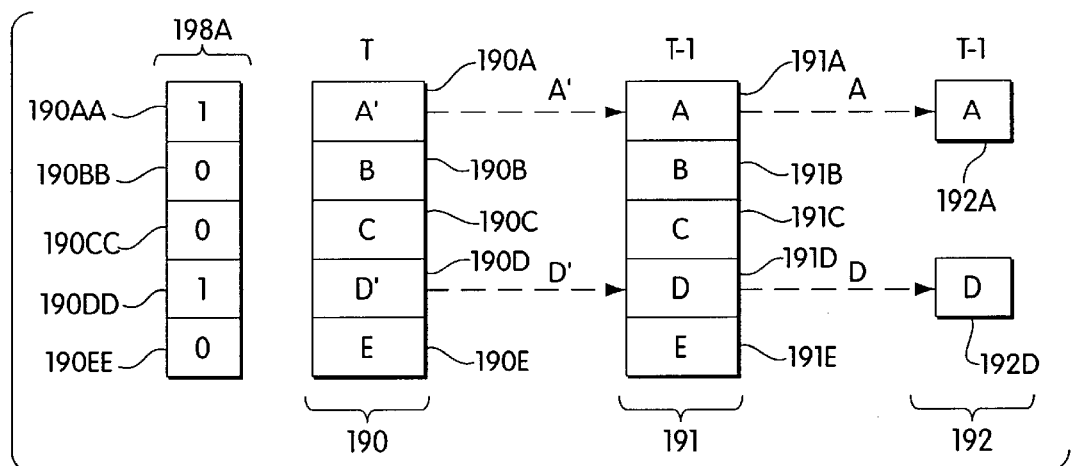
FIG. 19A illustrates one example of performing a differential backup from a backup version of a primary copy of data.
Figure 19B:
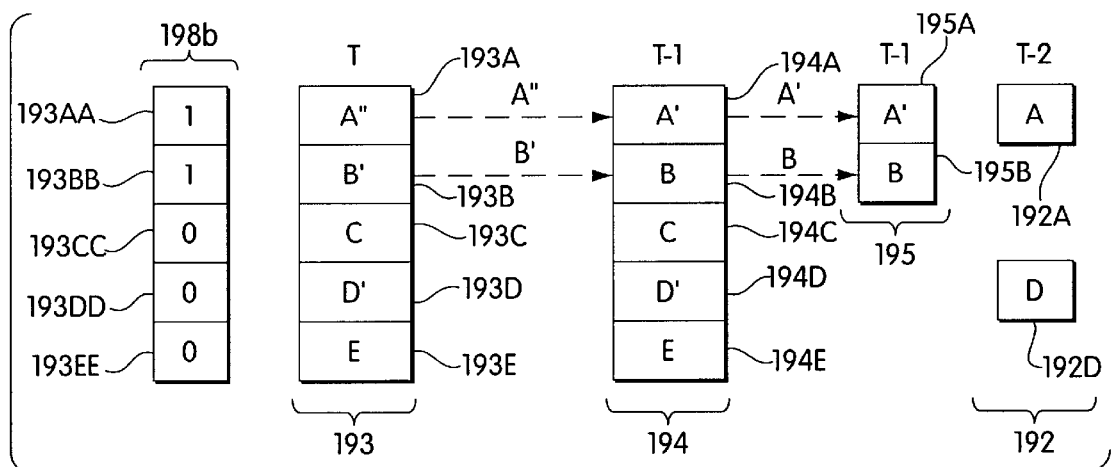
FIG. 19B shows the example of FIG. 19A, at a later period of time when a further differential backup is performed.
Figure 19C:
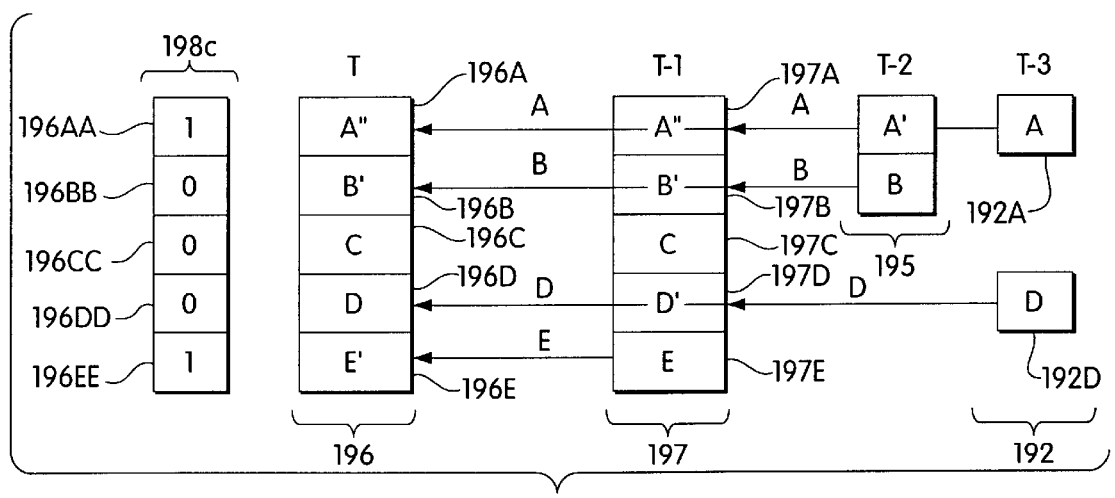
FIG. 19C shows an example of restoring the primary copy of data based on the backups of FIGS. 19A and 19B.

FIG. 19A illustrates a system where differential backups may be performed from a backup copy. In this example, a primary copy of the data is stored at 190. This may correspond to a physical disk drive, such as those generally described above. In the examples of FIGS. 19A–19C, the backups are performed at the physical level—without examining what data segments correspond to which logical elements. In alternative embodiments, this may be performed at the logical level, by performing the appropriate mapping from physical to logical and back, as generally described above. The primary copy 190 includes segments of memory 190a–190e.

The primary copy 190 also has an associated bit mask 198a. The bit mask marks changes in data since the last backup was performed. In this example, bits 190aa and 190dd are set, indicating that the segments 190a and 190d have been changed since the last backup (to backup copy 191).

A backup copy 191 was stored at a time T-1. For example, the backup copy could be a mirror of the primary copy 190, with the link between the mirrors broken. The link may be reestablished at certain periods of time, such as every 24 hours, to perform the backup. In this case, the backup copy 191 would reflect a periodic 24 hour backup. In other embodiments, the backup may be stored in any manner, including a tape backup or other form of backup.

Updating the backup copy 191 from the primary copy 190 may be performed by only copying those segments that have changed since the last backup. Accordingly, segment A' 190a would be copied to the corresponding segment of the backup copy 191a. Similarly, the segment D'190d may be copied to the corresponding segment of the backup memory 191d.

This may be done by completely rewriting the backup memory 191, or by copying only those segments that have been changed, as indicated by the bit mask 198a. Where the backup copy 191 is stored in a mirror of the primary copy 190, this may be done by resynch'ing the two mirrors.

Before this is done, however, a differential backup 192 may be taken. This would correspond to saving the old version of the segments that are to be updated. In this example, the bit mask 198a indicates that the old data A stored at 191a and the old data D stored at 191d may be saved before backup copy 191 is updated. The result is a differential backup 192. As before, although a space is shown between the backed up data 192a and 192d, this may be stored contiguously in a single memory such as on a tape drive.

FIG. 19B illustrates formation of a second differential backup at a later time. Referring to the physical bit mask 198b, the first two segments 193a, 193b of the primary copy 193 have been changed since the backup performed as illustrated in FIG. 19A. The backup copy 194 includes the data from the preceding backup, i.e., data corresponding to the primary copy 190 of FIG. 19A. In addition, the differential backup formed as explained with respect to FIG. 19A is still available (backup 192, now corresponding to time T-2).

In FIG. 19B, because the first two segments 193a, 193b have been changed, these will be backed up into the backup copy 194. Before this is done, however, the old data A' and B stored in segments 194a and 194b are backed up differentially. Thus, a differential backup 195 is formed that includes the old data from these segments.

FIG. 19C illustrates the restore process performed at a time after the backup described with respect to FIG. 19B. The restore is for a target time corresponding to time T-3 —when backup 192 was performed.

The physical bit mask 198c illustrates that only the last segment 196e has been updated since the last backup—the bit 196e e is set to one.

The backup copy 197 was performed at time T-1, corresponding to the backup performed from the primary copy 193 to the backup copy 194 of FIG. 19B.

The differential backup 195 corresponds to a time earlier than the backup copy 197 (e.g., 48 hours earlier rather than 24 hours earlier). Similarly, the backup 192 for time T-3 corresponds to even older data (e.g., 72 hours earlier).

The restore process proceeds by taking the oldest backed up copy of the data that has been stored at the restore time or after, for each segment that has been changed. Thus, the first segment A was backed up in the oldest differential backup 192 as shown at 192a. Because this is the oldest data available, it may be copied to the primary copy 196a. This may be done directly, or where the backup copy 197 is on a mirror, by copying it the mirror 197 and later resynch'ing 197 with the primary copy 196.

Similarly, a differential backup exists for the second segment B as shown at 195b. Accordingly, this segment is copied to the primary copy 196b.

There are no differential backups for the third segment C. In addition, the bit mask 196cc is not set for this segment. Accordingly, no updating of information needs to be made for this segment—it has not changed since time T-3.

As for the first segment A, the fourth segment D has a differential backup at time T-3. Accordingly, this is copied to the applicable segment 196d of the primary copy 196.

Finally, the bit 196ee of the physical bit mask 198c is set, indicating that the fifth segment E' has been changed since the last backup. Because there is no differential backup data for this (more recent than time T-3), this data is taken from the backup copy 197. Accordingly, the data E from the backup copy 197, stored at 197e, is copied to the primary copy 196 in the appropriate segment 196e.

When the primary and backup copies correspond to the actual physical storage devices, the procedures applied above may be done directly. In another embodiment, where logical elements are mapped onto an array of physical devices, logical to physical and physical to logical mapping may be performed. Thus, with reference to FIG. 19A, the bit mask 198a may be a logical bit mask constructed from the physical bit masks on the actual physical storage devices, as described above. When data is selected for copying to the backup copy, there may similarly be a mapping of logical elements to physical locations.

Figure 20:
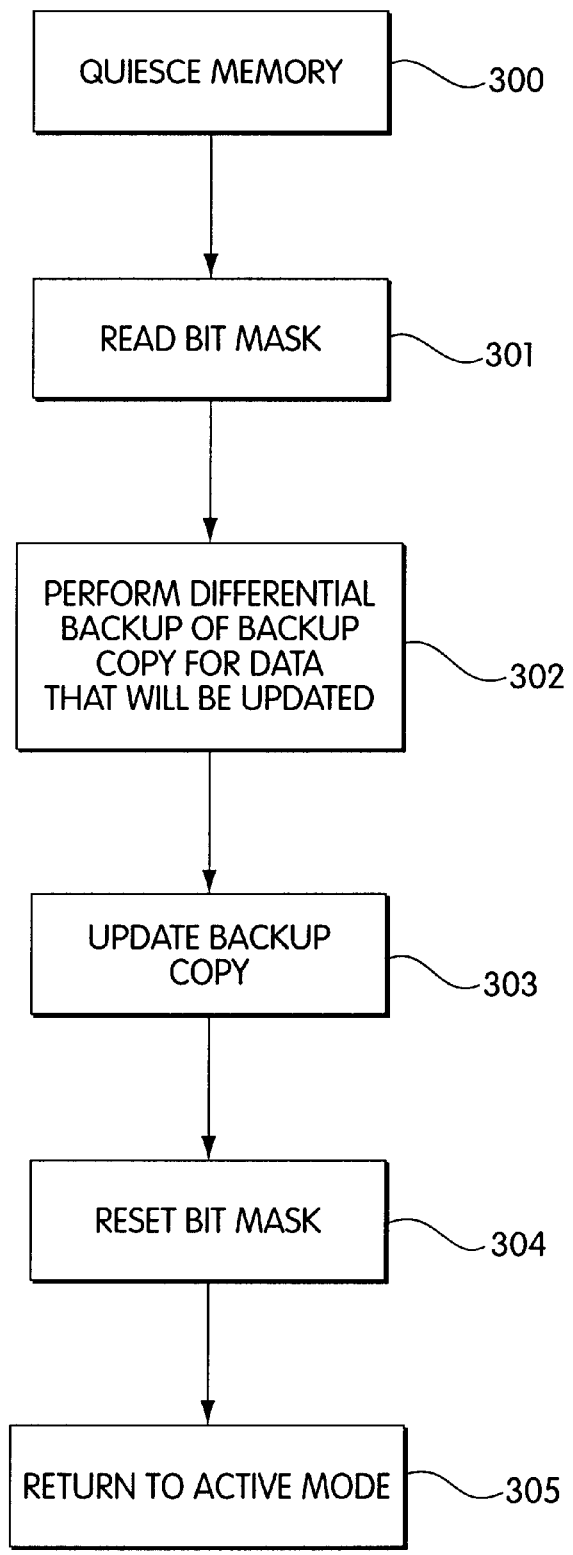
FIG. 20 illustrates one example of a method for performing a differential backup from a backed up copy of a primary copy of data.

FIG. 20 illustrates one example of a method for performing differential backups from a backup copy. As in the earlier embodiments, the affected memory is first quiesced at a step 300.

At a step 301, the bit mask for a primary copy of the data is read. As described above, this may involve mapping the components of a logical element onto actual physical disk drives to determine which portions of a physical bit masks are relevant, and then converting those portions of the physical bit masks into a logical bit mask.

At a step 302, a differential backup is performed. At step 302, the segments of the backup copy that correspond to the changed data segments in the primary copy are selected for backup. In the example of FIG. 19A, this corresponds to forming the differential backup 192.

At a step 303, the backup copy is updated. Thus, in the example of FIG. 19A, the backup copy 191 is updated to correspond to a current version of the primary copy 190. As described above, the backup in primary copies are mirrors, this may correspond to resychronizing the mirrors. In this case, after the mirrors have been resynchronized, the link between the mirrors is again broken. Breaking the mirrors allows the backup copy 191 to serve as a continuing backup copy, as further changes are made to the primary copy 190.

At a step 304, the bit mask for the primary copy (or, at least the bits that were affected for the backup of a logical element) are reset to zero. This permits the system to track further changes from the point in time of the update backup copy performed at step 303.

At a step 305, the system is returned to active mode.

Figure 21:
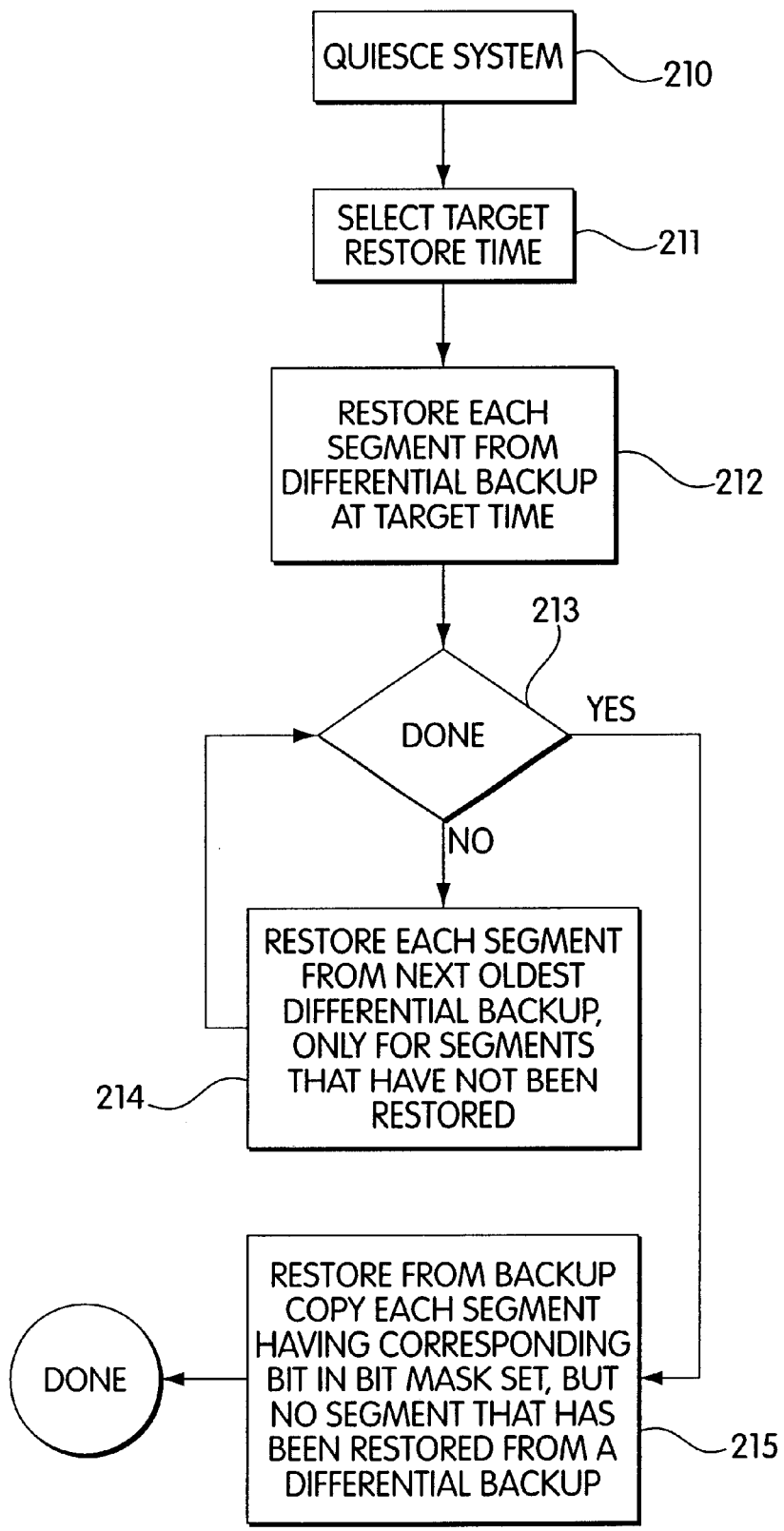
FIG. 21 illustrates one embodiment of a method for restoring from data backed up in accordance with the embodiment of FIG. 20.

FIG. 21 illustrates one embodiment of a method for restoring data that has been backed up according to the method of FIG. 20.

At a step 210, the affected memory of the system is quiesced. At a step 211, a target time is selected for the restore process.

At a step 212, the differential backup performed at the target time is selected. Each segment from that differential backup is selected to be restored to the primary copy. This may be done directly or by copying the applicable segments into a mirror which is later resynchronized with the primary copy. As discussed above, this process may also require a step of mapping a differential backup performed at the logical level onto actual physical devices.

Referring again to FIG. 19C, step 212 corresponds to selecting both segments 192a and 192d of the differential backup 192, assuming that the target time T-3 has been selected for the restore process.

At a step 213, it is determined whether all of the differential backups have been restored from. In this embodiment, if any differential backup more recent than the target time has not been restored from, the backup process is not yet complete.

In this case, at a step 214, each segment from the next oldest differential backup is restored to the primary copy, with the exception of segments that have already been restored from an earlier (older) differential backup. Referring again to FIG. 19C, the next differential backup is differential backup 195, corresponding to time T-2. The first segment 195a of differential backup 195 is not restored, because this corresponds to a segment that has already been restored from an earlier backup (segment 192a of differential backup 192). On the other hand, no segment corresponds to segment 195b of differential backup 195 has been restored. Accordingly, this segment may be restored to the primary copy.

After all of the differential backups have been examined (and used for restoration, where applicable), the backup copy (e.g., 197) may be used for any remaining restores. (Of course, the actual differential backup copies need not be actually examined; in an alternative embodiment, a catalogue is kept of what data is within each differential backup. This may then be used to determine whether and what portions of each differential backup will be used to restore to the primary copy.)

At a step 215, the backup 197 is used for any remaining restores. In this case, the bit mask 198c may be used to determine what segments have been changed since the last backup (which formed backup 197). For each of those segments, the corresponding segment from the backup 197 is restored, unless a corresponding segment from one of the differential backups has already been restored (or selected for restoration).

Figure 22:
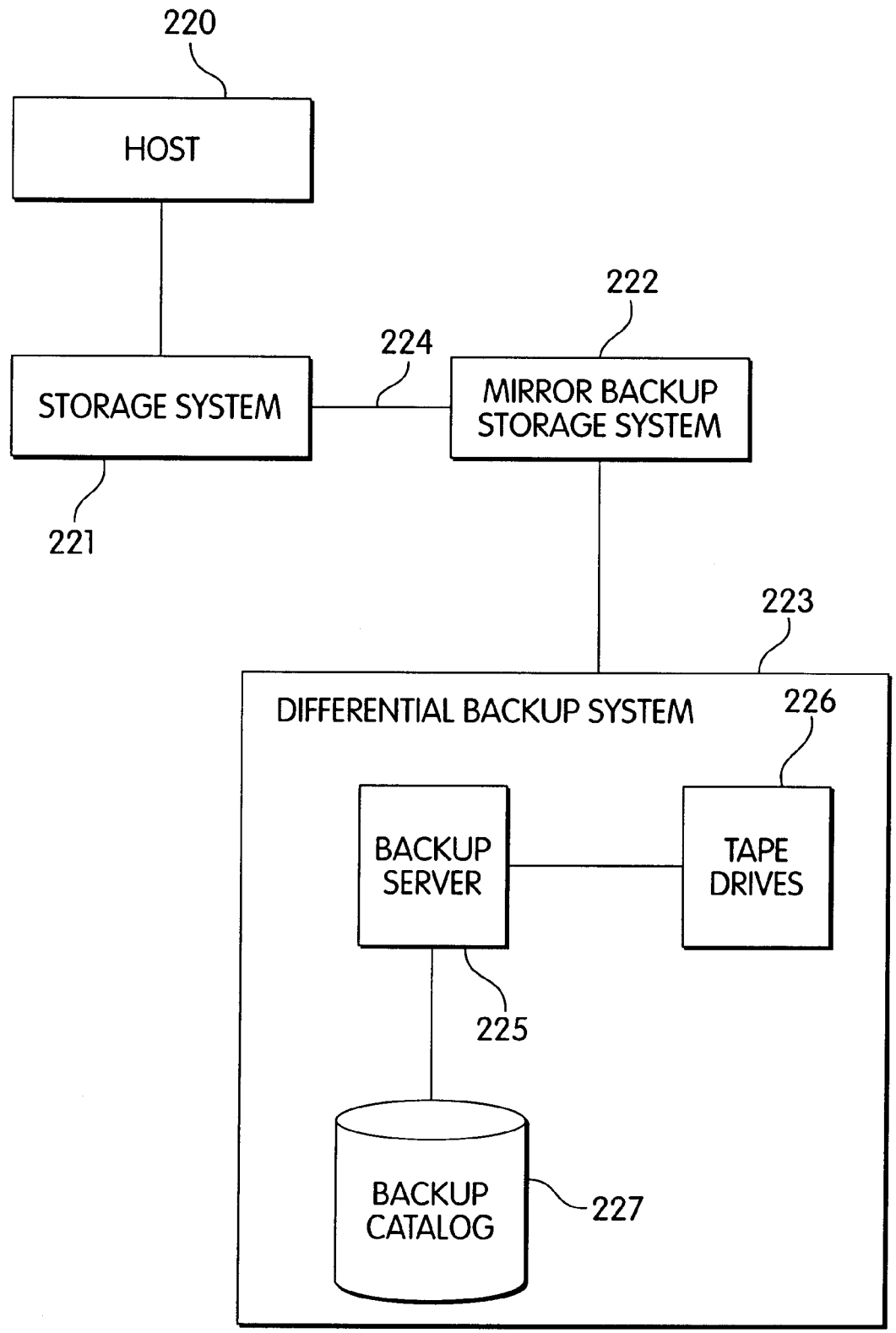
FIG. 22 illustrates one embodiment of a system that is configured to perform the methods of FIGS. 20 and 21.

FIG. 22 illustrates one embodiment of a system that performs differential backups according to the embodiment described above. The system includes a host 220 that performs normal processing functions. The host may, for example, be a Solaris system, available from Sun Microsystem, Jr an HP-UX operating system with a VERITAS logical volume manager. The host computer uses a master storage system 221 for storing and retrieving data. This storage system may, as one example, be a Symmetrix storage system, as described above, including a mechanism to provide physical bit masks, also as described above. In this case, the host 220 and the storage system 221 may be connected by a SCSI connection. A mirroring backup storage system 222 may also be provided. In this example, the mirroring backup storage system may be a slave Symmetrix system. The mirror backup storage system 222 may be coupled directly to the storage system 221, or may be located at a remote facility. When located at a remote facility, the mirroring backup storage system may be connected over a telephone line periodically (e.g., once per day) for receiving backup information from the storage system 221.

A differential backup system 223 is also provided. An EDM server, described above, may be used to perform this function. The differential backup system 223 may include a backup server 225. Differential (or other) backups may be stored using tape drive units 226. In addition, a backup catalogue 227 may be made available. The backup catalogue may include a listing of all of the backup information stored on the various tapes and the tape drives 226. For example, the backup catalogue 227 may be used to store information recording what contents are in each differential backup stored on the tape drives 226. The backup catalogue may be a data base or other data structure stored in a computer memory associated with the backup server 225.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of backing up data in a computer storage system, the data being stored in a plurality of identifiable segments, the method comprising steps of:

(a) at a first time, identifying which segments have been changed since a preceding backup;

(b) forming a first backup that includes a copy of the identified changed segments and omits at least one of the segments that has not changed; and (f) calculating a bit map for a logical element in the first backup that includes information to determine the location of the identified changed segments in the logical element; and wherein
the identifiable segments are formed in units corresponding to physical segments of storage in the computer storage system.

2. The method of claim 1, wherein the step (a) comprises a step of receiving a physical bit mask.

3. The method of claim 1, wherein the computer storage system stores data according to a fixed block architecture and the identifiable segments correspond to blocks of data in the fixed block architecture.

4. The method of claim 1, wherein:
the computer storage system stores data on at least one disk drive;
the disk drive includes at least one track; and
the identifiable segments correspond to tracks on the disk drive.

5. The method of claim 1, further comprising steps of:
(c) at a second time, identifying which of the identifiable segments have been changed since the preceding backup; and
(d) forming a second backup that includes a copy of the changed identifiable segments, identified in step (c), and omits at least one of the segments that has not changed.

6. The method of claim 1, further comprising steps of:
(c) at a second time, identifying which of the identifiable segments have been changed since the first time; and
(d) forming a second backup that includes a copy of the changed identifiable segments, identified in step (c), and omits at least one of the segments that has not changed.

7. The method of claim 1, wherein
the identifiable segments constitute a logical element, each identifiable segment having a location in the logical element;
each identifiable segment is stored in a physical segment of memory; and
the step (a) comprises a step of
(e) mapping the locations of the identifiable segments in the logical element to the physical segments of memory.

8. The method of claim 7, wherein the step (e) comprises a step of converting one or more physical bit masks into a logical bit mask.

9. The method of claim 1, wherein:
the identifiable segments constitute the logical element, each identifiable segment having a respective location in the logical element; and
the step (b) comprises steps of forming a backup file including the identified changed segments and the bit map.

10. The method of claim 1, wherein the step (f) comprises a step of determining a logical bit map for the logical element.

11. The method of claim 1, wherein the step (f) comprises a step of determining a differential bit map for the logical element.

12. A backup storage system, comprising:
a differential backup generator to receive information specifying which physical segments of storage in a physical storage device have changed data and to generate a differential backup, the differential backup comprising a bit map for a logical element in the first backup that includes information to determine the location of the identified changed segments in the logical element; and
a backup storage device to store the differential backup.

13. The storage system of claim 12, wherein the backup storage device comprises a tape drive.

14. The storage system of claim 12, further comprising the physical storage device, the physical storage device including means for tracking which of the physical segments have been changed since a preceding level zero backup.

15. The storage system of claim 12, further comprising the physical storage device, the physical storage device including means for tracking which of the physical segments have been changed since a preceding differential backup.

16. The storage system of claim 12, wherein the differential backup generator comprises means for mapping physical locations of the physical segments to logical locations of the physical segments within a logical element.

17. The storage system of claim 12, wherein the differential backup generator comprises means for generating a differential bit file.

18. The storage system of claim 17, wherein the differential backup generator further comprises means for generating a differential bit map for the differential bit file.

19. The method of claim 12, wherein the bit map comprises a logical bit map.

20. The method of claim 12, wherein the bit map comprises a differential bit map for the first backup.

21. A method of forming a complete backup copy of a plurality of segments of data in a computer storage system, the complete backup copy corresponding to the plurality of segments at a target time, the method comprising steps of:
(a) providing an earlier backup copy of the plurality of segments corresponding to an earlier time before the target time;
(b) providing a first later copy of at least one of the segments, corresponding to a time after the earlier time; and
(c) using a bit map for the first later copy to form a complete backup from the earlier backup copy and the first later copy.

22. The method of claim 21,
further comprising a step of providing a second later copy of at least one of the segments, corresponding to a time after the earlier time and before the time of the first later copy; and
wherein the step (c) comprises a step of
(d) forming the complete backup from the earlier backup copy, the first later copy and the second later copy.

23. The method of claim 22, wherein the step (d) comprises a step of selectively copying segments from the earlier backup copy, the first later copy and the second later copy.

24. A backup storage system, comprising:
means for storing an earlier backup copy of a plurality of physical segments constituting a logical element, the earlier backup copy corresponding to an earlier time, and for storing a first later copy of at least one of the segments, corresponding to a time after the earlier time; and
means using a bit map for the first later copy to form a complete backup from the earlier backup copy and the first later copy.

25. The backup storage system of claim 24, wherein
the means for storing comprises means for storing a second later copy of at least one of the segments, corresponding to a time after the earlier time and before the time of the first later copy; and
the means for using comprises means for forming the complete backup from the earlier backup copy, the first later copy and the second later copy.

26. The backup storage system of claim 24, wherein
the means for storing comprises means for storing a second later copy of at least one of the segments, corresponding to a time after the earlier time and before the time of the first later copy; and
the means for using comprises means for forming the complete backup from the earlier backup copy, the first later copy and the second later copy.

* * * * *